United States Patent
Vagell et al.

(10) Patent No.: US 10,380,225 B1
(45) Date of Patent: Aug. 13, 2019

(54) SYSTEMS AND METHODS FOR LAYOUT TRANSFORMATION OF DOCUMENT CONTENT

(71) Applicant: Google Inc., Mountain View, CA (US)

(72) Inventors: Vance Julius Vagell, Kew Gardens, NY (US); Amber Hampton, New York, NY (US); Colleen O'Banion, Brooklyn, NY (US); Dominic Marin Espinosa, New York, NY (US); Elias Horne, New York, NY (US); Sarah Cooper, New York, NY (US); Shikhiu Ing, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 394 days.

(21) Appl. No.: 14/331,570

(22) Filed: Jul. 15, 2014

(51) Int. Cl.
*G06F 17/00* (2019.01)
*G06F 17/21* (2006.01)
*G06F 3/0485* (2013.01)

(52) U.S. Cl.
CPC .......... *G06F 17/212* (2013.01); *G06F 3/0485* (2013.01)

(58) Field of Classification Search
CPC ...... G06F 17/211; G06F 17/212; G06F 17/21; G06F 17/27; G06F 17/2765; G06F 3/0485; G06F 17/243; G06F 3/04883; G06F 2203/04808; G06F 3/017
USPC .................................................. 715/247, 244
See application file for complete search history.

(56) References Cited

U.S. PATENT DOCUMENTS

| | | | | |
|---|---|---|---|---|
| 2001/0043741 A1* | 11/2001 | Mahoney | ........... | G06K 9/00463 382/199 |
| 2002/0170025 A1* | 11/2002 | Shih | ................... | G06F 13/4217 327/144 |
| 2004/0205623 A1* | 10/2004 | Weil | ..................... | G06F 17/217 715/251 |
| 2011/0179350 A1* | 7/2011 | Capela | ................. | G06F 17/211 715/244 |
| 2012/0131516 A1* | 5/2012 | Chiu | .................. | G06F 3/04883 715/863 |
| 2012/0254733 A1* | 10/2012 | Tucovic | ................ | G06F 17/212 715/243 |
| 2013/0066625 A1* | 3/2013 | Peters | .................... | G06F 17/27 704/9 |

(Continued)

OTHER PUBLICATIONS

Bloodworth, "Drag and Drop—Layout Preview Design Pattern", Oct. 2008, Wiki Fluid Project, pp. 1-3.*

*Primary Examiner* — Jason T Edwards
(74) *Attorney, Agent, or Firm* — Lowenstein Sandler LLP

(57) ABSTRACT

Systems and methods are disclosed herein for transitioning a display of a document from a first layout to a second layout. A processor at a user interface displays the document in the first layout. The processor receives a first user input indicative of a request to convert the display from the first layout to the second layout that represents the document as having a plurality of portions. The processor identifies a suggested boundary at a first position between two of the plurality of portions, displays the document in the second layout having the suggested boundary at the first position, and receives a second user input indicative of a request to move the suggested boundary to a second position different from the first position. The document is displayed in the second layout having the boundary in the second position.

24 Claims, 25 Drawing Sheets

(56) References Cited

U.S. PATENT DOCUMENTS

| | | | | |
|---|---|---|---|---|
| 2013/0104015 A1* | 4/2013 | Nonaka | ................. | G06F 17/212 |
| | | | | 715/204 |
| 2014/0289614 A1* | 9/2014 | Ayers | .................... | G06F 17/211 |
| | | | | 715/247 |

* cited by examiner

SYSTEMS AND METHODS FOR LAYOUT TRANSFORMATION OF DOCUMENT CONTENT

FIELD OF THE INVENTION

This disclosure relates to layout transformation of document content.

BACKGROUND

Document content is increasingly displayed digitally, rather than being printed onto sheets of physical paper. However, many document formatting and editing applications are designed with paper considerations in mind. In particular, existing document editing applications are typically concerned with ensuring that the digital view matches the view of the document when printed on paper. As digital devices become increasingly mobile, it is undesirable to restrict document formatting and editing applications to digital views that mimic how the document content looks on paper. As an example, page breaks are not a concern in the digital environment because the digital view is not limited based on the size of a sheet of paper.

SUMMARY

Systems and methods are disclosed herein for transitioning a display of a document from a first layout to a second layout. A processor at a user interface displays the document in the first layout. The processor receives a first user input indicative of a request to convert the display from the first layout to the second layout that represents the document as having a plurality of portions. The processor identifies a suggested boundary at a first position between two of the plurality of portions, displays the document in the second layout having the suggested boundary at the first position, and receives a second user input indicative of a request to move the suggested boundary to a second position different from the first position. The document is displayed in the second layout having the boundary in the second position.

Another aspect relates to a system including means for transitioning a display of a document from a first layout to a second layout. The system includes means for displaying the document in the first layout and means for receiving a first user input indicative of a request to convert the display from the first layout to the second layout that represents the document as having a plurality of portions. The system further includes means for identifying a suggested boundary at a first position between two of the plurality of portions, means for displaying the document in the second layout having the suggested boundary at the first position, and means for receiving a second user input indicative of a request to move the suggested boundary to a second position different from the first position. The system further includes means for displaying the document in the second layout having the boundary in the second position.

In some embodiments, the suggested boundary is identified based on document content in the two of the plurality of portions, and the document content corresponds to at least one in the group consisting of text content, paragraph content, header content, image content, table content, and formatting content. The suggested boundary at the first position may immediately precede paragraph content, header content, image content, or table content. The suggested boundary at the first position may immediately follow paragraph content, image content, or table content. The second position of the boundary may be a parameter of the second layout and may be stored with the document.

In some embodiments, the first layout represents the document as a single continuous scrolling portion. The system may further include means for receiving a third user input indicative of a request to convert the display from the second layout to the first layout, and means for combining the plurality of portions in the second layout into a single continuous portion. The document content in the first layout may be displayed at a first size, the document content in the second layout may be displayed at a second size different from the first size, and the document content may be text, image, or table content.

In some embodiments, the user interface includes a touch screen and the first user input and the second user input are touch inputs. The system may further include means for receiving a third user input indicative of a request to add an additional boundary at a third position after the document is displayed in the second layout. The system may include means for receiving a third user input indicative of a request to reorder the plurality of portions in the second layout or to combine at least two of the plurality of portions into a single portion.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

To provide an overall understanding of the invention, certain illustrative embodiments will now be described, including a system for transforming a layout of document content. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
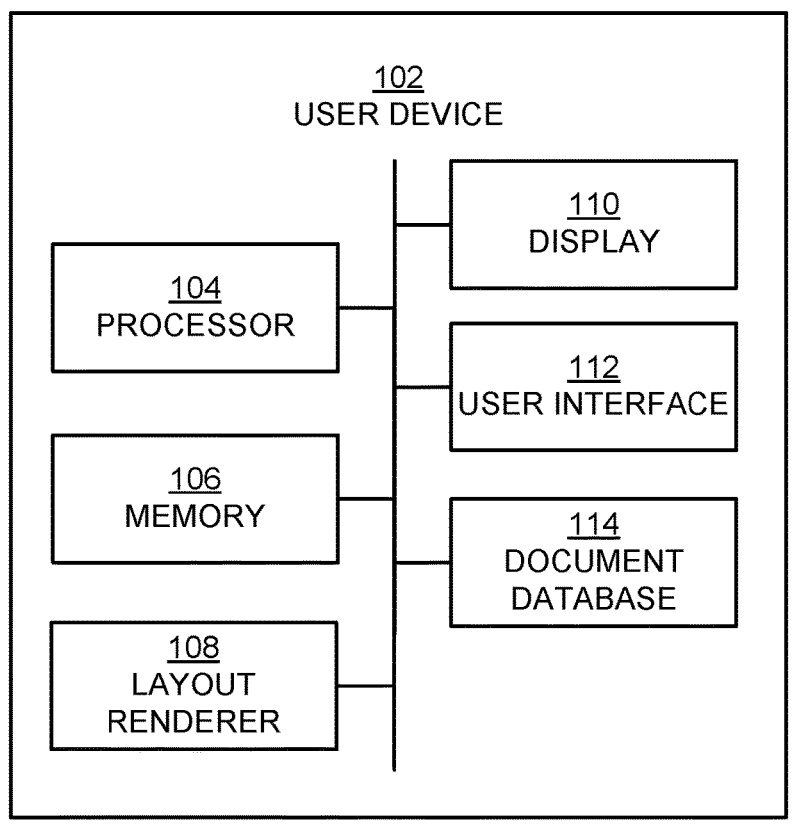
FIG. 1 is a diagram of a user device for displaying document content, according to an illustrative embodiment.

FIG. 1 is a diagram of a user device 102 for displaying document content. The user device 102 includes a processor 104, a memory 106, a layout renderer 108, a display 110, a user interface 112, and a document database 114, all of which are connected to a data bus within the user device 102. A user interacts with the user device 102 over the user interface 112 to view or edit a document, which may be stored in the document database 114. The document may be stored in the document database 114 and may correspond to a presentation with the user wishes to interact, such as by displaying, editing, or viewing the presentation. The layout renderer 108 is responsible for rendering a layout of the document content in the document on the display 110.

The layout renderer 108 may determine to render the layout in accordance with one of multiple modes. In one example, at least two modes may be used. In particular, a "continuous mode" may refer to a layout in which the document content within a document is displayed on the user device 102 as one continuous and fluid piece. The display of the document may include a scroll bar so that the user may change the view of the document to display various regions of the document. In contrast, a "portioned mode" may refer to a layout in which the document content within a document is divided into multiple portions, such that boundaries or borders exist between consecutive portions. In the portioned mode, the placement of the boundaries may initially be automatically suggested based on the document content and a size of the portions, and the user may be allowed to modify the boundaries by adding additional boundaries, removing existing boundaries, modifying the position of any existing boundaries, or any suitable combination thereof. While the systems and methods of the present disclosure are described in relation to continuous mode or portioned mode, other modes may be used. In an example, a heterogeneous mode may be used such that a document is divided into multiple portions, but one or more of the portions is displayed in a continuous mode.

To accommodate the increasing demand for convenient displaying of digital content, the systems and methods of the present disclosure enable a device to transform a display of a document between a continuous layout and a portioned layout. While the demand for digital displays increases, less emphasis is placed on the appearance of document content on printed sheets of paper. In particular, documents in the digital document content environment are not necessarily printed, such that page breaks between sheets of paper are not a concern. In this manner, it may be desirable to display document content as a single continuous piece. When a document is displayed in a continuous layout mode, the document content may be allowed to grow. When the amount of document content exceeds a size of the display 110, the user may scroll vertically, horizontally, diagonally, or in multiple directions to view additional document content. For example, the document content may include a table that is larger than the size of the display 110. The user may scroll in any direction within a view of the display to view different regions of the table. In an example, document content may be automatically adjusted to fit the screen of the display. In particular, various objects in document content may be automatically repositioned based on the size and aspect ratio of a screen, and text may be resized or wrapped accordingly. However, documents often include multiple sections, such as a title, abstract, introduction, etc. In this case, it may be desirable to divide a document into multiple portions in accordance with the various sections. The portioned layout may include document content that is absolutely positioned on portions with fixed size. It is desirable to provide an easy method of transitioning a view of document content from a continuous layout to a portioned layout, and vice versa, so that users may envision how document content is displayed digitally.

The user device 102 includes, without limitation, any suitable combination of one or more input devices (e.g., keypads, touch screens, trackballs, voice recognition systems, etc.) and/or one or more output devices (e.g., visual displays, speakers, tactile displays, printing devices, etc.). As used herein, "user device" includes, without limitation, any suitable combination of one or more devices configured with hardware, firmware, and software to carry out one or more of the computerized techniques described herein. Examples of user devices include, without limitation, personal computers, laptops, and mobile devices (such as smartphones, PDAs, tablet computers, etc.).

The processor 104 refers to one or more computers, microprocessors, logic devices, servers, or other devices configured with hardware, firmware, and software to carry out one or more of the computerized techniques described herein. Processors and processing devices may also include one or more memory devices, or may use the memory 106 for storing inputs, outputs, and data that is currently being processed. Any of the functions described herein as being performed by the processor 104 may be performed by the layout renderer 108, and vice versa. The memory 106 or a memory device in the processor 104 may store computer readable instructions that when executed, cause the processor 104 and/or the layout renderer 108 to perform any of the functions described herein. For example, the processor 104 may carry out instructions stored in the memory 106 that cause the processor to provide the user interface 112 to the display 110 to present the content of a document in a particular manner. The processor 104 may also receive user input over the user interface 112 to modify a layout rendering of a document and/or to modify the content of the document.

Figure 2:
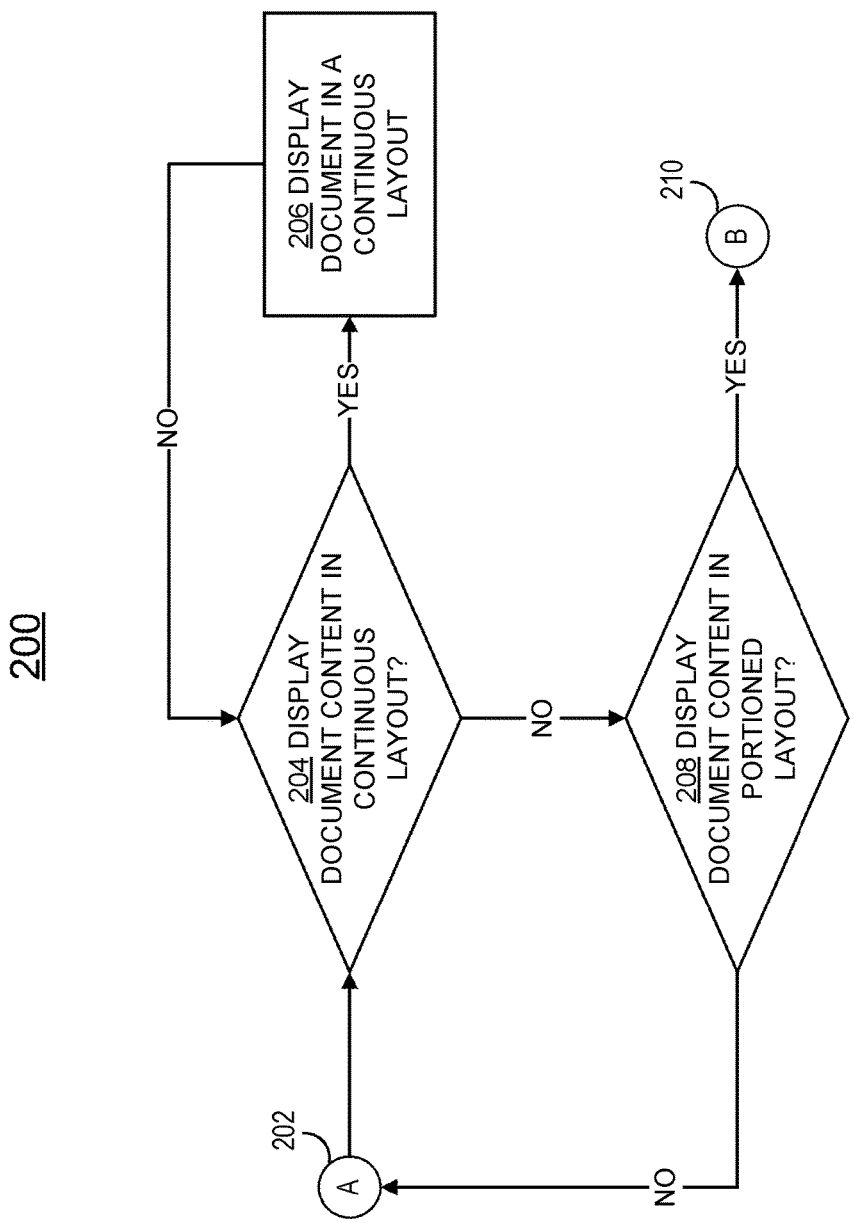
FIG. 2 is a flow chart of a method to determine an appropriate layout mode for displaying document content, according to an illustrative embodiment.
Figure 3:
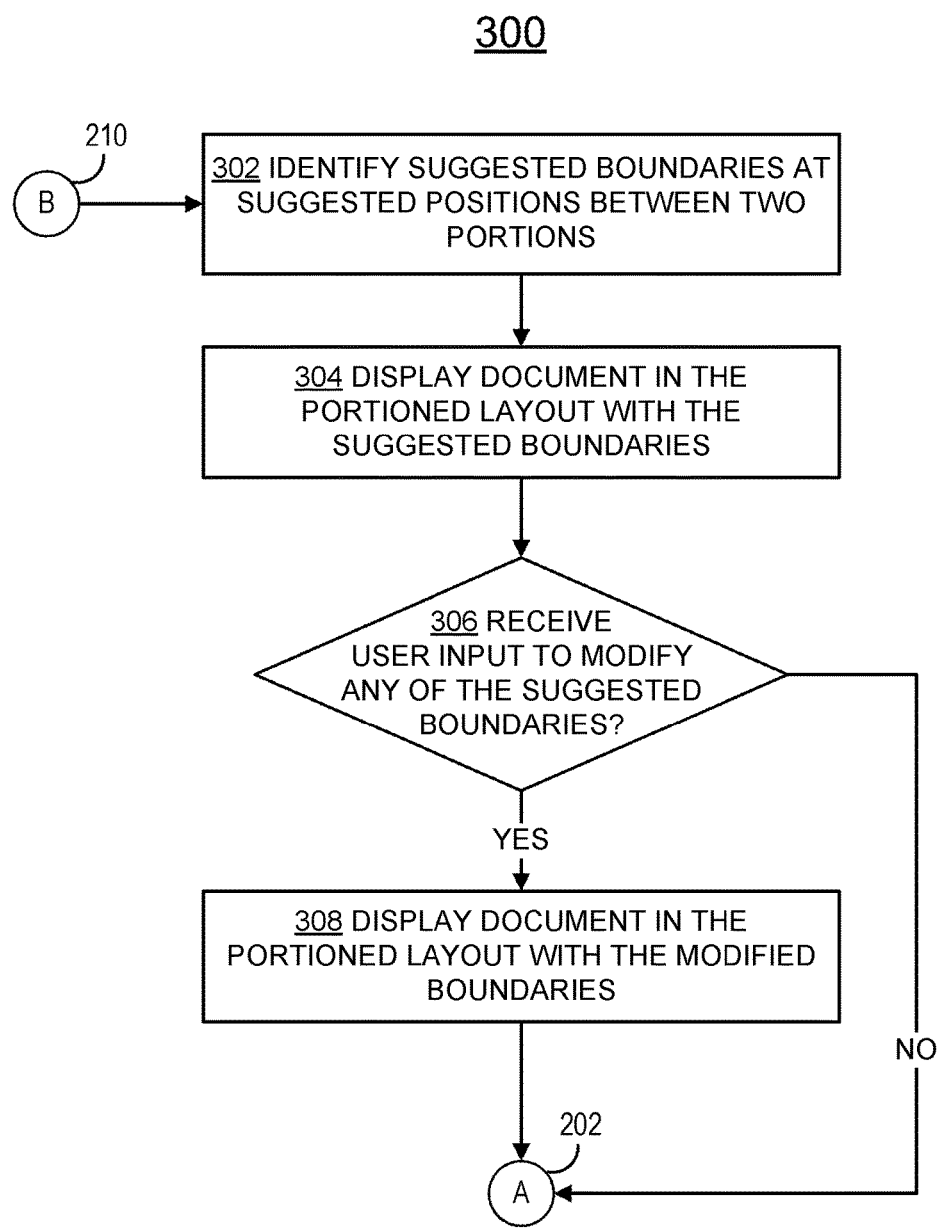
FIG. 3 is a flow chart of a method for transforming document content into a portioned layout, according to an illustrative embodiment.
Figure 4:
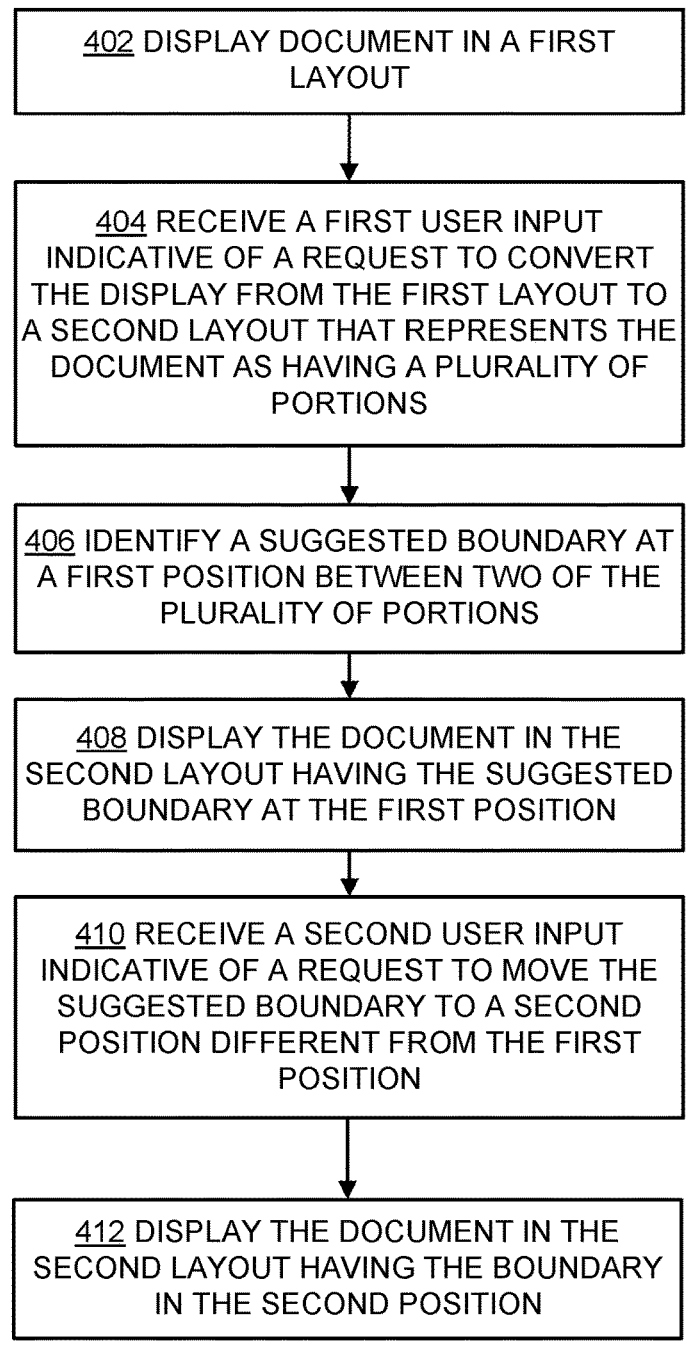
FIG. 4 is a flowchart of a method for transforming document content from a first layout to a second layout, according to an illustrative embodiment.

FIGS. 2-4 are example flow charts of methods that may be executed by the processor 104 or the layout renderer 108 to transform a layout of a document from one mode into another mode. FIGS. 5-24 are example diagrams of various displays of the user interface 112 that show how a user may interact with a presentation document to switch between different layout modes, or to modify borders between different portions of a document.

FIG. 2 is a flow chart of a method 200 to determine an appropriate layout mode for displaying document content, according to an illustrative embodiment. The method 200 may be executed by a processor such as the processor 104, and includes the step of determining whether to display document content in a continuous layout (decision block 204). If the continuous layout mode should be used, the document is displayed in a continuous layout (step 206). Displaying a document in a continuous layout mode may cause the document to be displayed as one continuous piece, such that a user may scroll through various regions of the document to view the different regions. An example of a document that is displayed in a continuous layout is described in relation to FIG. 5. The document is displayed in a continuous layout at step 206 until it is determined that the document content should no longer be displayed in the continuous layout at decision block 204.

When the document content should not be displayed in the continuous layout, the processor 104 determines whether to display the document content in a portioned layout at decision block 208. Displaying a document in a portioned layout may cause the document to be displayed in multiple portions. Various examples of a document that is displayed in a portioned layout are described in relation to FIGS. 6-12 and 14-24. Moreover, an example method for suggesting boundaries and allowing a user to modify the boundaries in a portioned layout is described in relation to FIG. 3.

As is shown in FIG. 2, the processor 104 first determines whether to display document content in a continuous layout at decision block 204, before determining whether to display document content in a portioned layout at decision block 208. Alternatively, if the only modes are the continuous layout mode and the portioned layout mode, a binary flag may be set to a first value to display the document content in a continuous layout and to a second value to display the document content in the portioned layout. In this manner, the processor 104 determines the appropriate mode of display based on the value of the flag. In this manner, decision blocks 204 and 208 may be combined into a single decision block.

FIG. 3 is a flow chart of a method 300 for transforming document content into a portioned layout such that the document is divided into multiple portions. The method 300 may be executed by a processor such as the processor 104 or the layout renderer 108, and includes the steps of identifying suggested boundaries at suggested positions between two portions (step 302), displaying the document in the portioned layout with the suggested boundaries (step 304), receiving a user input to modify any of the suggested boundaries (decision block 306), and displaying the document in the portioned layout with the modified boundaries (step 308).

At 302, the processor 104 identifies suggested boundaries at suggested positions between two portions of a document. In an example, such as that shown in FIG. 5, the document content 520 is initially displayed in a continuous layout. The document content 520 may then be segmented into multiple portions for display in a portioned layout mode. In order to segment the document content 520, the processor 104 may identify a set of suggested boundaries for dividing the document content 520 into multiple portions. The processor 104 may determine the set of suggested boundaries based on any number of factors, including but not limited to the document content (such as text content, paragraph content, header content, image content, video content, table content, and formatting content), size of the display of the user device 102, and the amount of document content 520.

In one example, a hard limit may be applied to the amount of content that is allowed to be on each portion. For example, a limited number of words or characters in a particular font size may be assigned to each portion. When the document content includes objects other than text, the sizes of the objects may be compared to the size of the portion to determine how many of the objects should be allotted to a particular portion. When document content includes both text and objects, the processor 104 may assign a combination of text content and object content to a particular portion based on the amount and size of the text and objects. In this manner, the document content may be parsed from beginning to end, and the document content may be sequentially allocated to portions.

In an example, the document content is not parsed from beginning to end. In this case, the document content may be parsed beginning with non-textual content, such as images, tables or other types of objects. In particular, it may be undesirable to break up these non-textual objects. For example, if there are multiple images positioned side-by-side, such as in FIG. 5, it may be desirable to place the images together on the same portion. In this case, the allocation of certain objects such as images, tables, graphs, and charts to various portions may be constrained by requiring various objects to be placed together on a portion or on their own portions without any other document content.

In one example, a document may include text, followed by a table, followed by additional text. The document content may be parsed beginning with the table. The table may be too large to fit on the specified dimensions of a portion, such that the size of the table may be scaled down so that the table fits onto a portion. Alternatively, if it is undesirable to scale the table down, one region of the table may be displayed on the allowed portion, and a user may scroll or navigate in any direction to view different regions of the table. The same principle may be applied to a large image or any other object within document content. In particular, it may be desirable to view a detailed region of the image within the portion, while being able to scroll or navigate to other regions of the image.

In some embodiments, text that is proximate the various objects in the document content may be manipulated or resized to accommodate the placement of the objects on certain portions. For example, the processor 104 may determine that an image is related to the text that immediately follows the image. In particular, the text that immediately follows the image may be a caption for the image, such that it is desirable to place both the image and the caption together on the same portion. In this case, the image may be anchored to the caption, and the processor 104 may position the suggested boundaries without placing the image and the caption on different portions. Similarly, text immediately preceding an image or another object may be anchored to that object. Equivalently, certain objects may be anchored to other objects, such that objects anchored to one another would appear on the same portion. In this manner, the processor 104 may detect relationships between various document content objects and select the suggested boundaries in accordance with the relationships.

In some embodiments, a suggested boundary is positioned to immediately precede certain types of document content, such as paragraph content, header content, image content, or table content. In this case, the beginning of a portion includes those certain types of document content. In some embodiments, a suggested boundary is positioned to immediately follow certain types of document content, such as paragraph content, image content, or table content. In this case, the end of a portion includes those certain types of document content. In some embodiments, a set of templates may be used to fit content to create a design that is aesthetically pleasing. While processing document content in the continuous layout, the processor 104 may determine whether a portion of text and/or objects would fit into one of those templates. If so, the document content may be subdivided such that the corresponding portion and/or objects are sectioned into the corresponding template. These different templates may have predefined parameters, such that when the processor 104 encounters document content in the continuous layout that meets those parameters, the processor 104 may subdivide the document content according to the corresponding template. For example, a first template in the set of templates may include parameters such as a tall image to the right of a block of text. When the processor 104 encounters a tall image in the continuous layout of the document and there is enough text adjacent to the image to use in the first template, this may cause the processor 104 to trigger subdividing the document content such that the tall image and the text are placed on a section using the first template.

Figure 5:
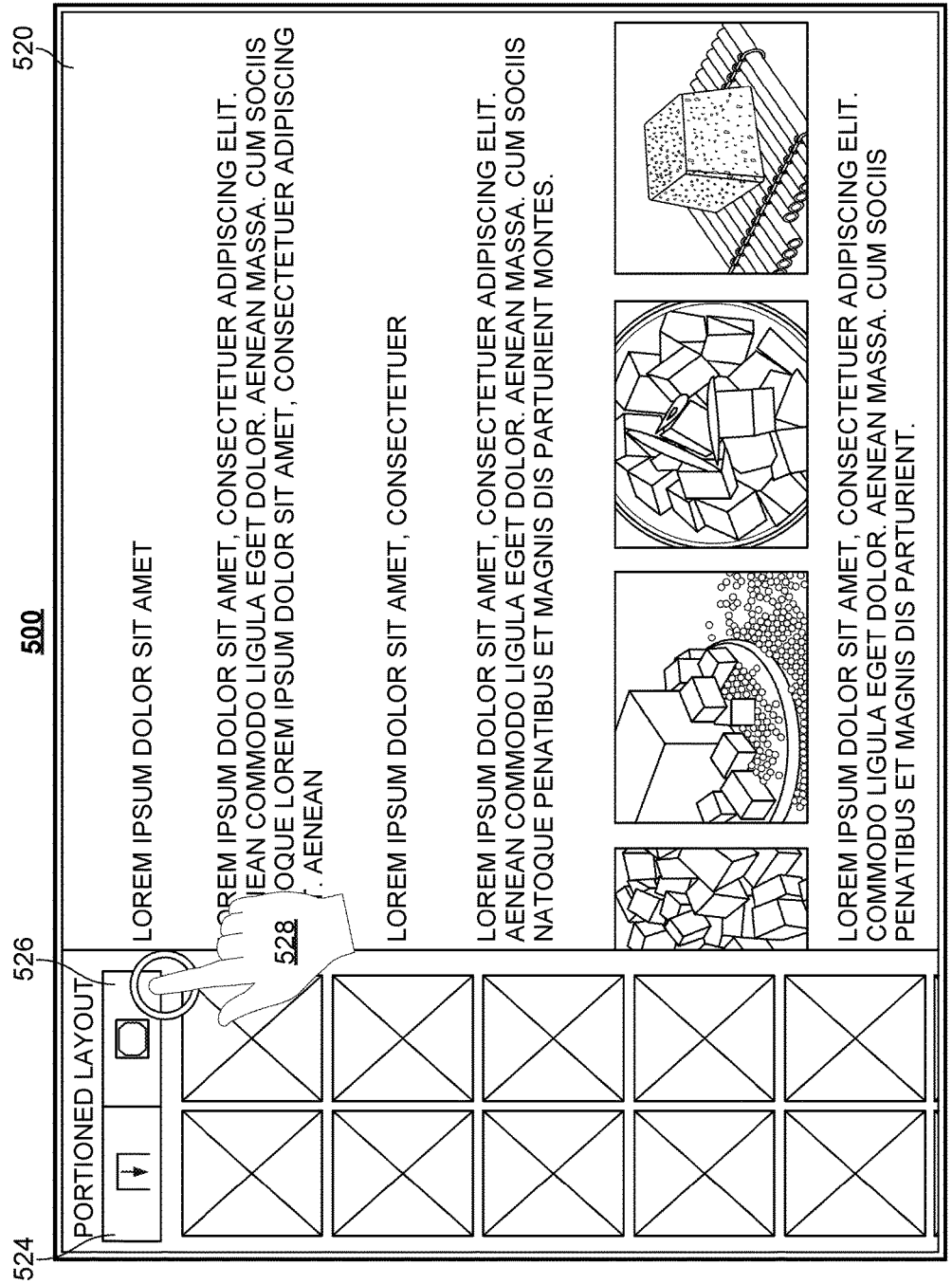
FIG. 5 is a diagram of an example display of document content in a continuous layout, according to an illustrative embodiment.

As is shown in FIG. 5, the display 500 includes a continuous layout display of the document content 520. The display 500 further includes a pointer 528, which is depicted in FIG. 5 as a user's hand. The display 500 may be shown on the display 110 or user interface 112 of the user device 102. In an example, the display 500 includes a touch screen, such that the pointer 528 is indicative of a location of the user's touch on the display 500. However, in general, the display 500 may be shown over any suitable user interface, such as a computer, a smartphone, a tablet, or any other suitable device for interacting with a user. The user interacting with the user device 102 may control the pointer 528 to select the continuous mode region 524 or the portioned mode region 526. When the continuous mode region 524 is selected, the document content 520 is displayed in a continuous layout, such as is shown in FIG. 5. Alternatively, if the pointer 528 selects the portioned mode region 526, then the document content 520 is displayed in a portioned layout such as that shown in FIG. 6.

Figure 6:
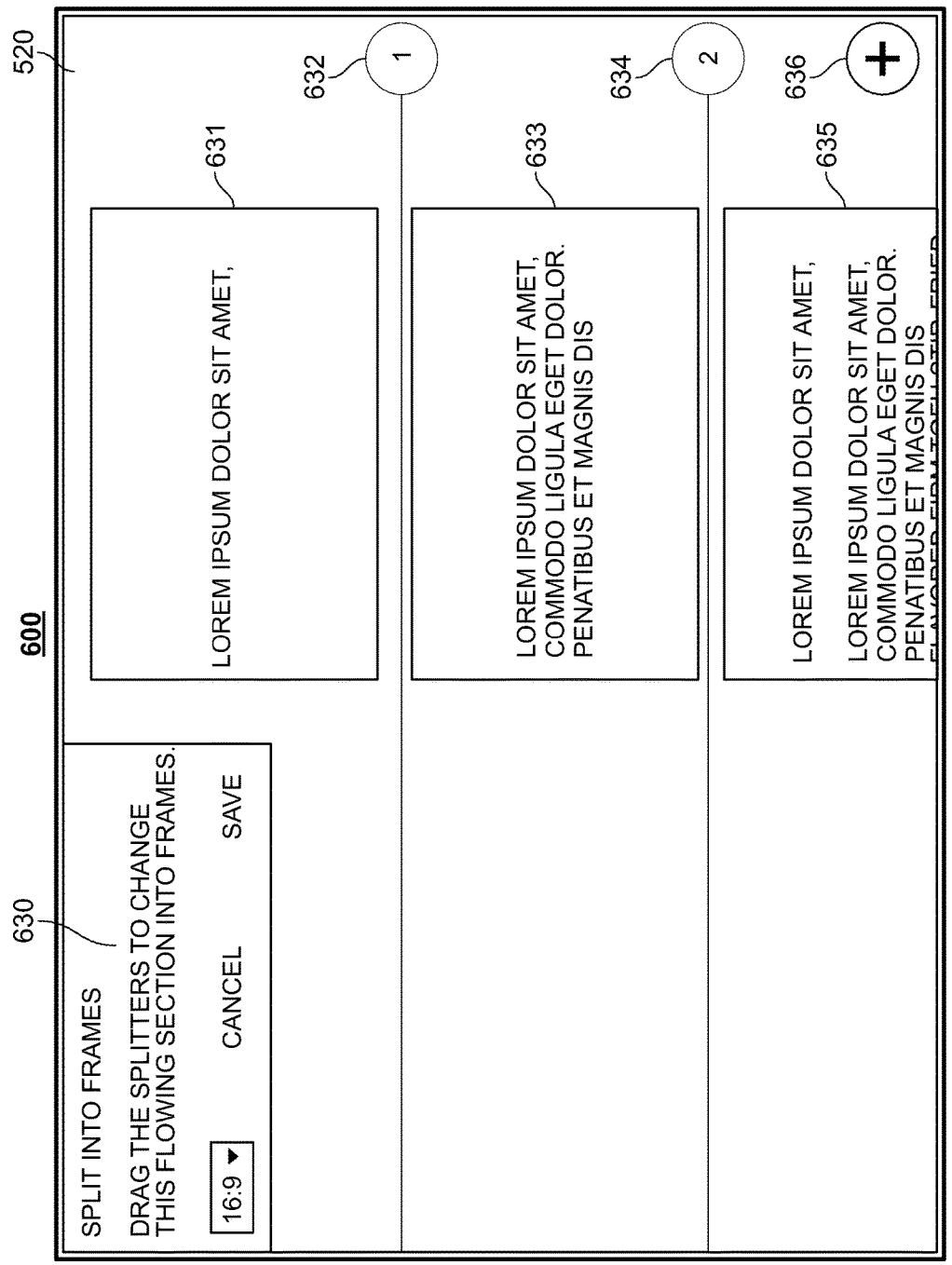
FIG. 6 is a diagram of an example display of document content in a portioned layout, according to an illustrative embodiment.

Referring back to FIG. 3, at step 304, the processor 104 displays the document content 520 in the portioned layout with the suggested boundaries, as is shown in FIG. 6. In the portioned layout that is shown in FIG. 6, the document content 520 is segmented into at least three portions 631, 633 and 635 of the document, with a first suggested boundary 632 between the portions 631 and 633 and a second suggested boundary 634 between the portions 633 and 635. In the display 600 of FIG. 6, the region 630 includes instructions for the user to drag the splitters (or boundaries 632 or 634) to change the positions of any of the boundaries. Moreover, the region 630 allows the user to select to change an aspect ratio of each portion of the document. In particular, the current view of the display 600 shows the portions 631, 633, and 635 having aspect ratios of 16:9, but in general, any suitable aspect ratio may be used. Similarly, the user may select precise dimensions of the portions.

FIG. 6 shows a preview of the suggested boundaries 632 and 634 to the user before the user saves the document. The preview may be displayed for the user to modify any of the boundaries or to move content between the portions 631, 633 and 635. For example, any portions that do not have any content after the user has modified the suggested boundaries may be automatically removed. The region 630 includes options for the user to cancel or save the display of the document content 520 in the portioned layout. Selecting the cancel area within the region 630 would cause the layout rendering of the document content 520 to return to the continuous layout shown in FIG. 5. Selecting the save area within the region 630 would cause the processor 104 to save the current settings of the portioned layout, such as the positions of the boundaries, the current aspect ratio, the dimensions of the portions, and the content of the portions.

The processor 104 may select the suggested boundaries 632 and 634 according to any number of methods. In one example, the processor 104 may recognize that the first line of the document content 520 is a title of a presentation document. In this case, it may be desirable to place the title on its own slide, without any other content, and the processor 104 may set the initial position of the first suggested boundary 632 to immediately follow the first line. In some embodiments, the processor 104 parses the document content 520 from top to bottom in this manner, incrementally assigning successive segments of document content 520 into various portions. In this case, the processor 104 may fill each successive portion with content until the respective portion is full, before beginning to file the next portion with further content. The amount of content in each portion may be based on the aspect ratio or dimensions of the portions, which may be modified by the user.

Referring back to FIG. 3, at decision block 306, the processor 104 determines whether user input to modify at least one of the suggested boundaries is received. As described herein, the systems and methods of the present disclosure allow a user to modify a set of suggested boundaries that divide document content 520 into multiple portions. As is described herein, a processor 104 may determine the set of suggested boundaries, and a user may manually modify the set of suggested boundaries by modifying a position of one or more of the suggested boundaries, removing one or more of the suggested boundaries, adding one or more additional boundaries, or any suitable combination thereof.

Figure 7:
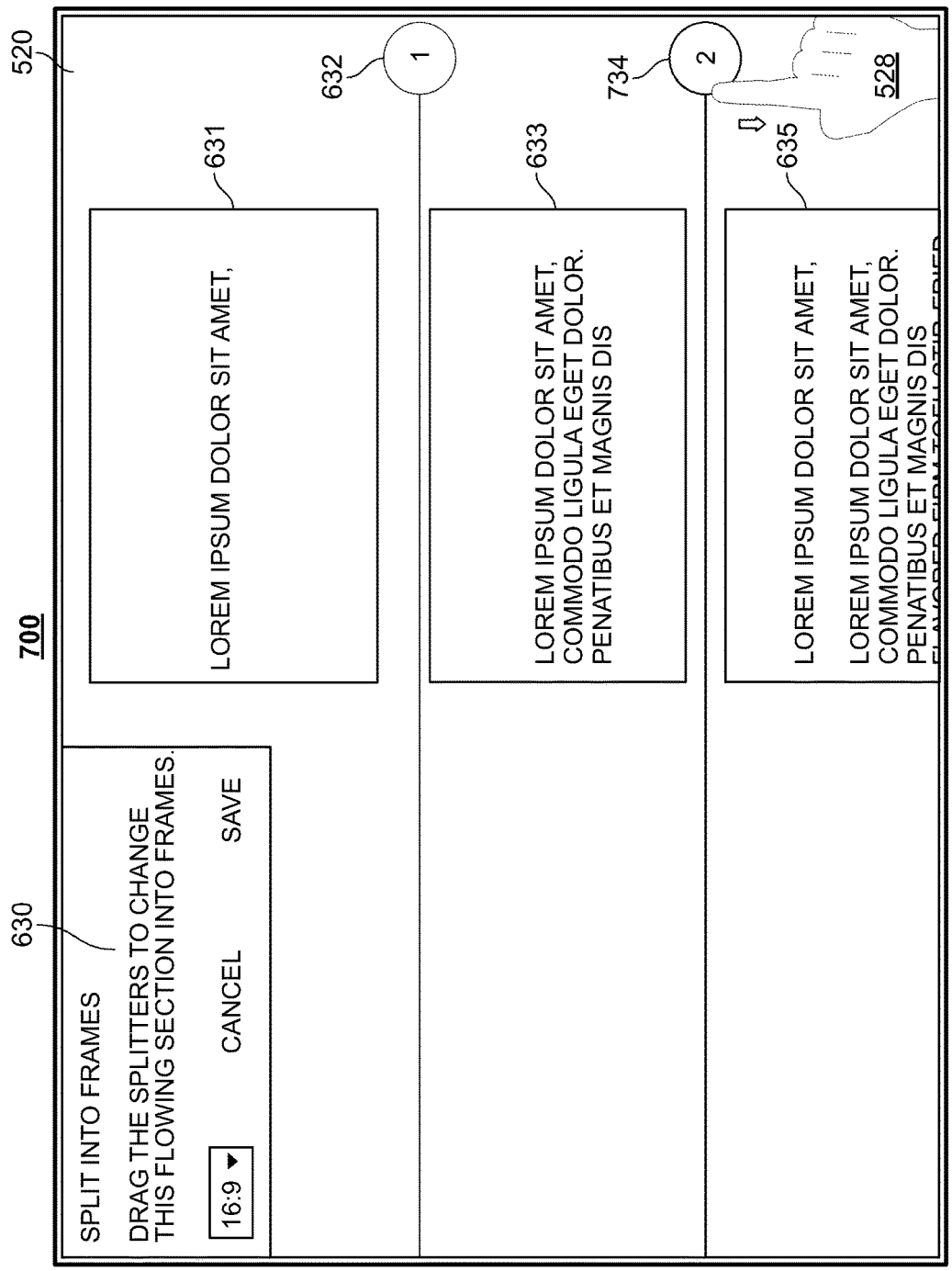
FIGS. 7-9 are diagrams of example displays of document content in a portioned layout, where a user modifies a position of a boundary, according to an illustrative embodiment.
Figure 8:
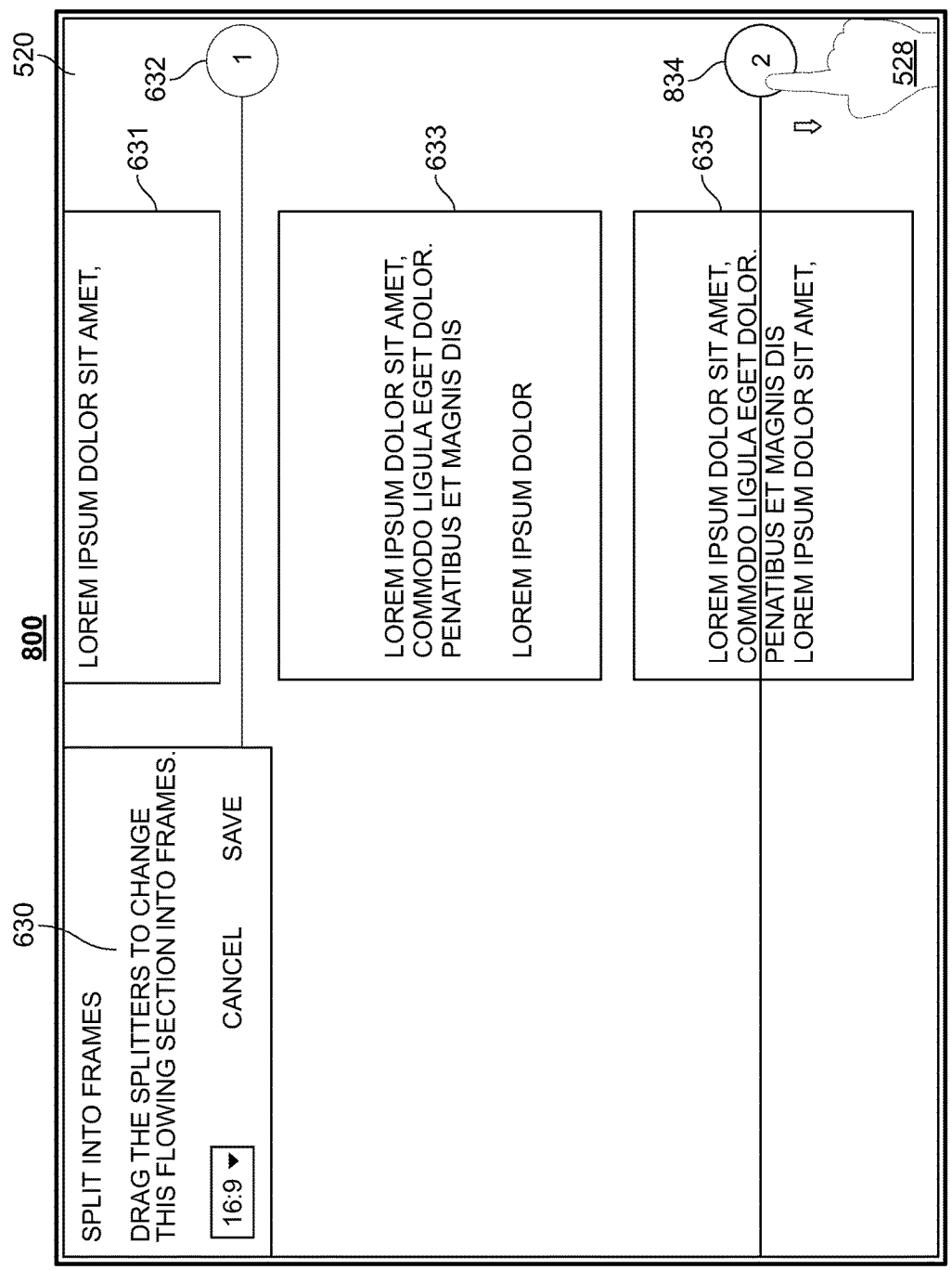

In some embodiments, the user modifies the set of suggested boundaries by providing user input that modifies a position of one or more of the suggested boundaries. An example of such input being provided by the user is shown in relation to FIG. 7, in which the pointer 528 selects the second original suggested boundary 634 (i.e., shown as the moving boundary 734 in FIG. 7). As is shown in FIG. 7, the pointer 528 drags the moving boundary 734 in a downward direction, causing document content to be shifted from the portion 635 to the portion 633. In other words, modifying the original boundary 634 to a new position below the original position causes the portion 633 to include additional content, while the portion 635 includes less content. FIG. 8 is an example of the display as the pointer 528 drags the moving boundary 834 (previously the moving boundary 734 in FIG. 7) downward into the portion 635.

Figure 9:
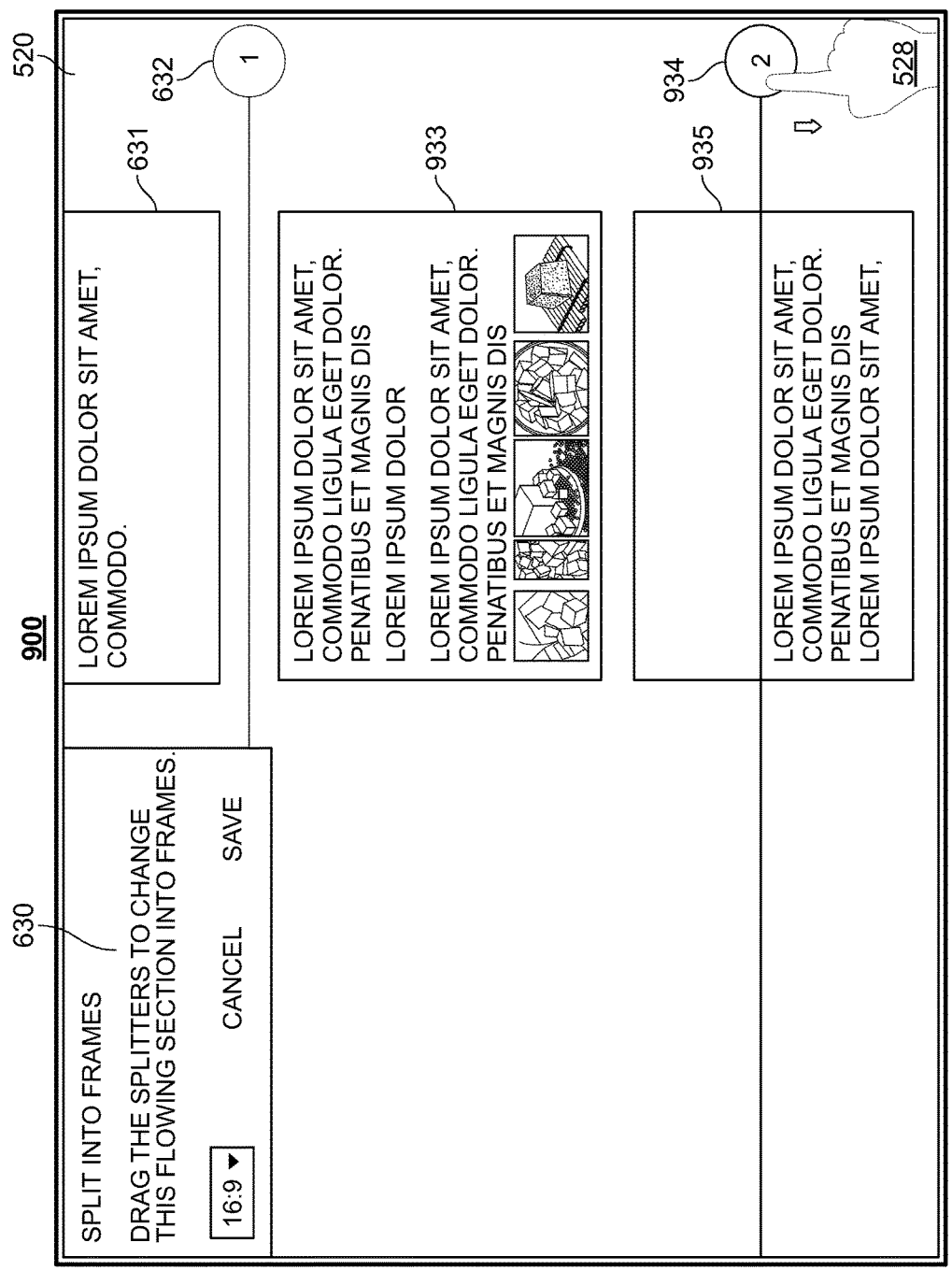

As the position of the moving boundary 834 is shifted downward, the document content within the portions 633 and 635 remains unchanged until the pointer 528 releases the moving boundary 834, or until the pointer 528 has dragged the moving boundary 834 by a threshold amount. The threshold amount may be determined based on an amount of document content 520 that is shifted from one portion to another during the dragging process. For example, as is shown in FIG. 9, the pointer 528 drags the moving boundary 934 (previously the moving boundary 834 in FIG. 8) further downward and past a series of images. The processor 104 may recognize the amount of document content 520 that has been passed by the moving boundary exceeds a threshold amount, and may then provide a rendering of updated portions 933 and 935. In particular, the updated portion 933 includes document content 520 from at least portions 633 and 635, and the updated portion 935 includes document content 520 that follows the portion 635. Providing such a rendering of the updated portions allows a user to see a live preview of the portions before the user releases the drag handle. In this manner, the live preview helps the user to make an informed decision regarding where to move the boundaries.

Figure 10:
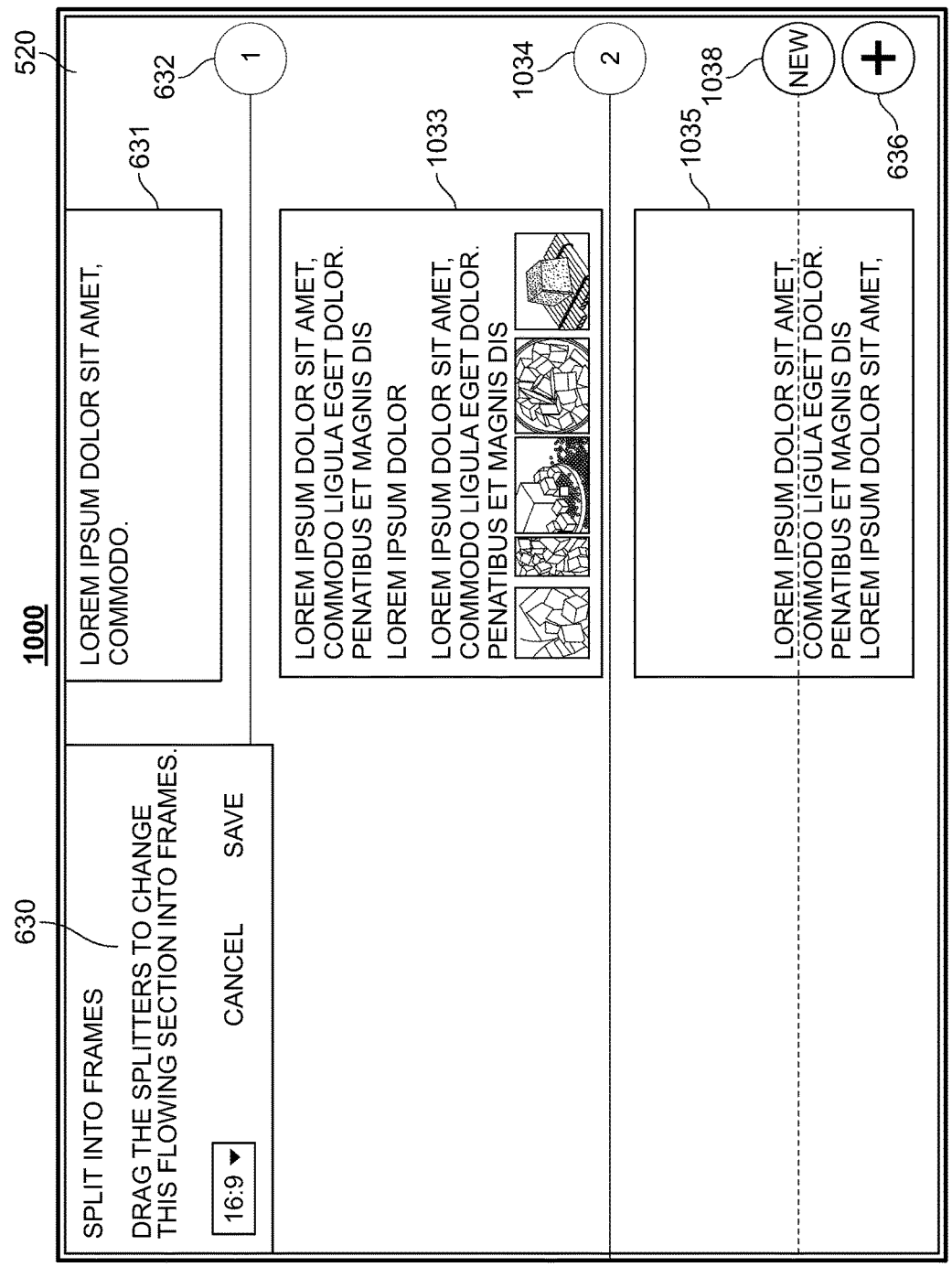
FIGS. 10-12 are diagrams of example displays of document content in a portioned layout, where a user adds a boundary and modifies the boundary's position, according to an illustrative embodiment.

In FIG. 10, the pointer 528 has released the moving boundary 934, thereby stopping the dragging process and causing the modified boundary 1034 to have an updated position compared to the original position of the suggested boundary 634 in FIG. 6. Because the position of the modified boundary 1034 is below the position of the suggested boundary 634, the placement of the document content 520 into the various portions is modified, such that the portion 1033 includes the document content 520 from at least the portions 633 and 635, and the portion 1035 includes document content 520 beyond those original portions 633 and 635. The example displays in FIGS. 6-10 are described in relation to dragging the position of a suggested boundary in a downward direction. In general, modified boundaries may be further modified, such that additional modifications may be made to previously modified boundaries. Moreover, the modification may occur in any direction, including downward, upward, or sideways. In this manner, the processor 104 enables a user to provide input to modify any of the positions of the boundaries, and at step 308, the document content is displayed in the portioned layout with the modified boundaries, such as is shown in FIG. 10.

In some embodiments, the user modifies the set of suggested boundaries by adding one or more new boundaries to the set. The user may provide a user input indicative of a request to add a new boundary to the layout by selecting the add button 636 shown in FIG. 6. In particular, FIG. 10 shows a display of a current view when pointer 528 has selected the add button 636. As is shown in FIG. 10, when the pointer 528 selects the add button 636, an added boundary 1038 is created. The initial position of the added boundary 1038 may be set to a default position near the add button 636, or in an alternate position. A graphical indication may be provided to the user that the position of the added boundary 1038 is not yet placed. FIG. 10 depicts this graphical indication as a horizontal dashed line extending across the portion 1035, and a "NEW" label at the right end of the dashed line. In general, any other suitable graphical indication, such as the use of colors, line styles, line widths, or any other suitable graphic, may be used to indicate that the boundary 1038 is not yet placed. In another example, gestures may be used to modify the boundaries by adding new boundaries, moving existing boundaries, or removing existing boundaries. In an example, to add a new boundary that divides an existing portion into two portions, a user may provide a gesture that pulls the portion apart at the desired location, or a gesture that draws a line across the existing portion. In these cases, there may be no particular user interface element, such as a button or a region that the user selects to indicate a desire to add a new boundary. Instead, the processor 104 may be configured to detect when such gestures are made, and may react to the gestures accordingly.

Figure 11:
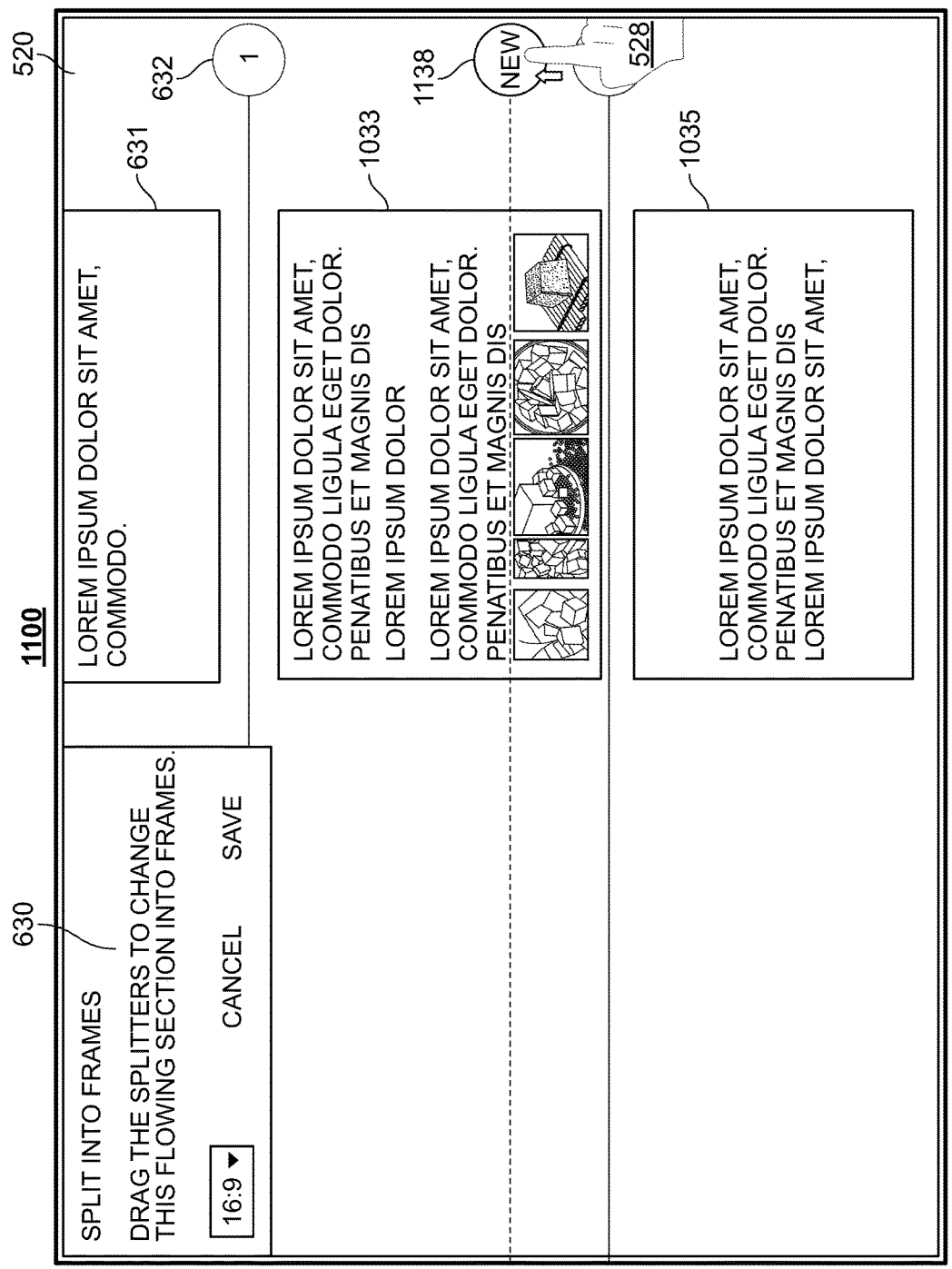
Figure 12:
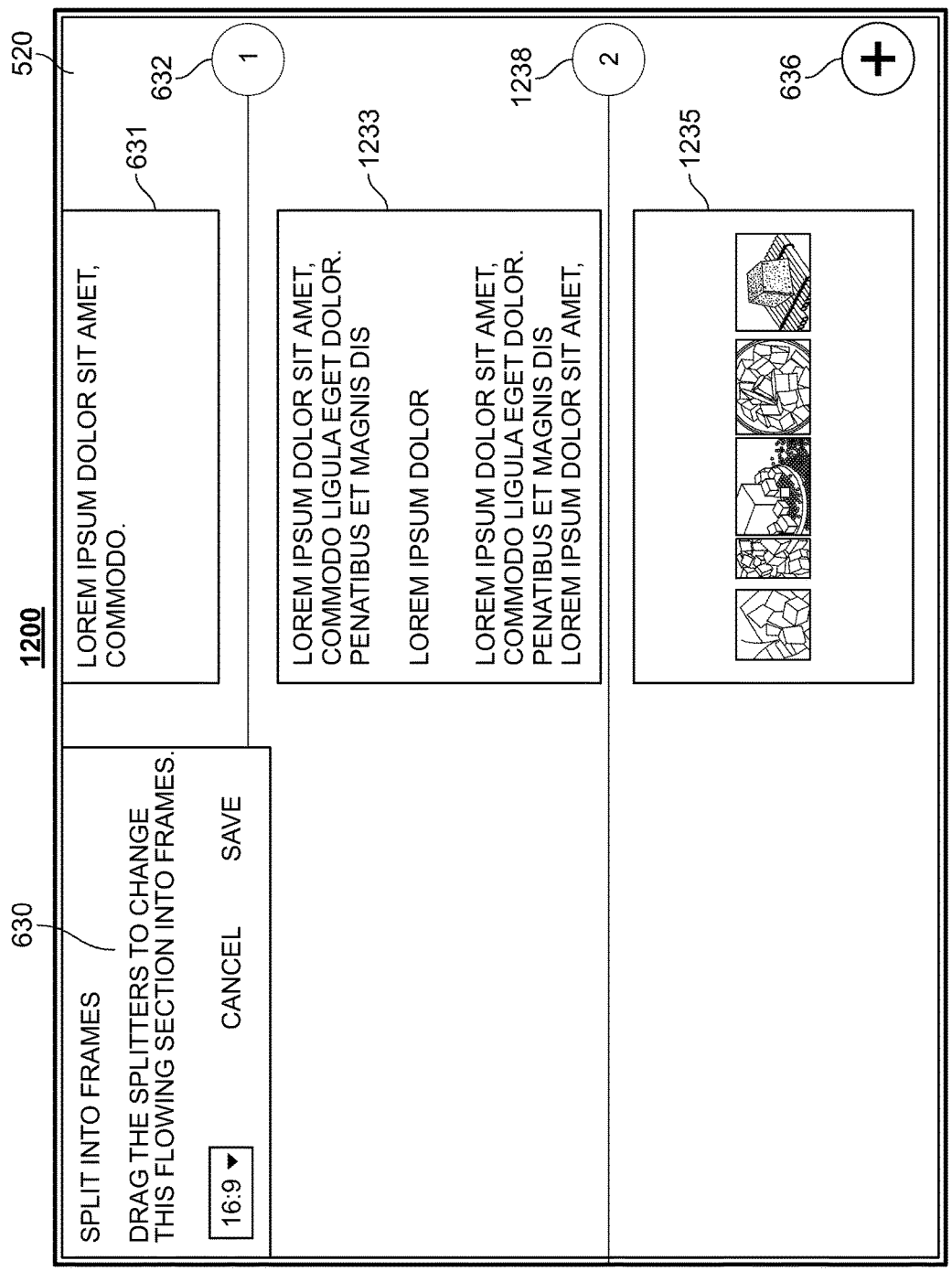

Just as the user may modify the position of any of the suggested or modified boundaries as is described above, the user may modify the position of the added boundary 1038. In particular, the user may control the pointer 528 to select the added boundary 1038 and drag the added boundary 1038 in any direction. FIG. 11 shows an example of the added boundary being dragged upward to a new position above the initial position of the added boundary 1038. When the pointer 528 releases the added boundary 1138, the boundary is placed at the released position, and the boundary is converted to a placed boundary 1238 as shown in FIG. 12. In particular, in FIG. 12, the position of the boundary 1238 is placed, such that the horizontal dashed line is converted to a solid line. The placed boundary 1238 divides the previous portion 1033 (in FIG. 10) into two portions 1233 and 1235 (in FIG. 12). In this manner, the processor 104 enables a user to provide input to add one or more boundaries to the display of the document content 520, and at step 308, the document content is displayed in the portioned layout with the added and modified boundaries, such as is shown in FIG. 12.

In some embodiments, the user modifies the set of boundaries by removing one or more boundaries from the set. The user may remove one or more boundaries from the set of boundaries on the display by providing user input indicative of a request to remove the selected boundaries. In an example, when the display is a touch screen, the user may provide a touch gesture, such as a swipe right or swipe left, to the boundary to be removed. Referring to FIG. 12, the user may select to remove the boundary 632, such that the portions 631 and 1233 are combined into a single portion. Moreover, the user may select to remove an original suggested boundary as initially provided by the processor 104 (such as the boundary 632, for example), or a new boundary added by the user (such as the boundary 1238, for example). In this manner, the processor 104 enables a user to provide input to remove one or more boundaries from the display of the document content 520, and at step 308, the document content is displayed in the portioned layout with any modified, added, or removed boundaries.

As is shown in FIG. 3, only one iteration of the decision block 306 and the step 308 is shown. In particular, the method 300 includes only one instance of the user providing user input to modify any of the suggested boundaries and displaying the document with the modified boundaries in the portioned layout. However, in general, one of ordinary skill in the art will understand that any number of iterations of decision box 306 and step 308 may be repeated, as long as the user provides further user input to modify any of the boundaries. As used herein, the term modifying any of the boundaries includes, but is not limited to, updating a position of any of the existing boundaries, adding new boundaries, and removing existing boundaries. Moreover, the same boundaries may be modified multiple times. For example, a boundary may be added by the user, and the position of the added boundary may be modified one or more times. In an example, the position of a boundary may be modified one or more times before being removed.

Decision block 306 and step 308 may be repeated as long as user input is received to modify, add, or remove any of the boundaries. When the user is done making changes to the set of boundaries, the process 300 returns to step 202, which in FIG. 2 leads to decision block 204, where the processor 104 to determine whether to display the document content in a continuous layout.

Figure 13:
FIG. 13 is a diagram of an example display of document content in a continuous layout in a portion, according to an illustrative embodiment.
Figure 14:
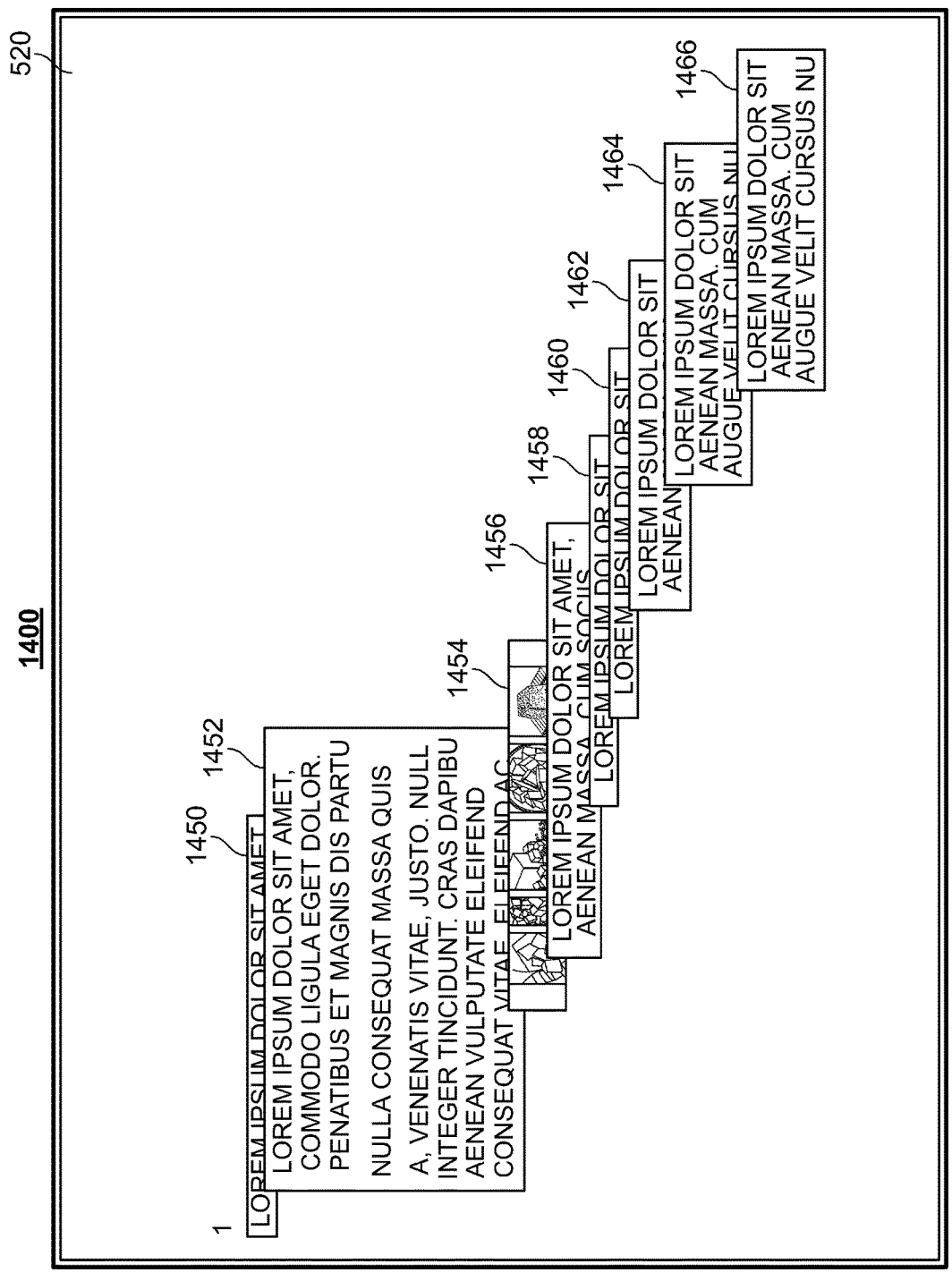
FIG. 14 is a diagram of an example display of document content during a transition from a continuous layout to a portioned layout, according to an illustrative embodiment.
Figure 15:
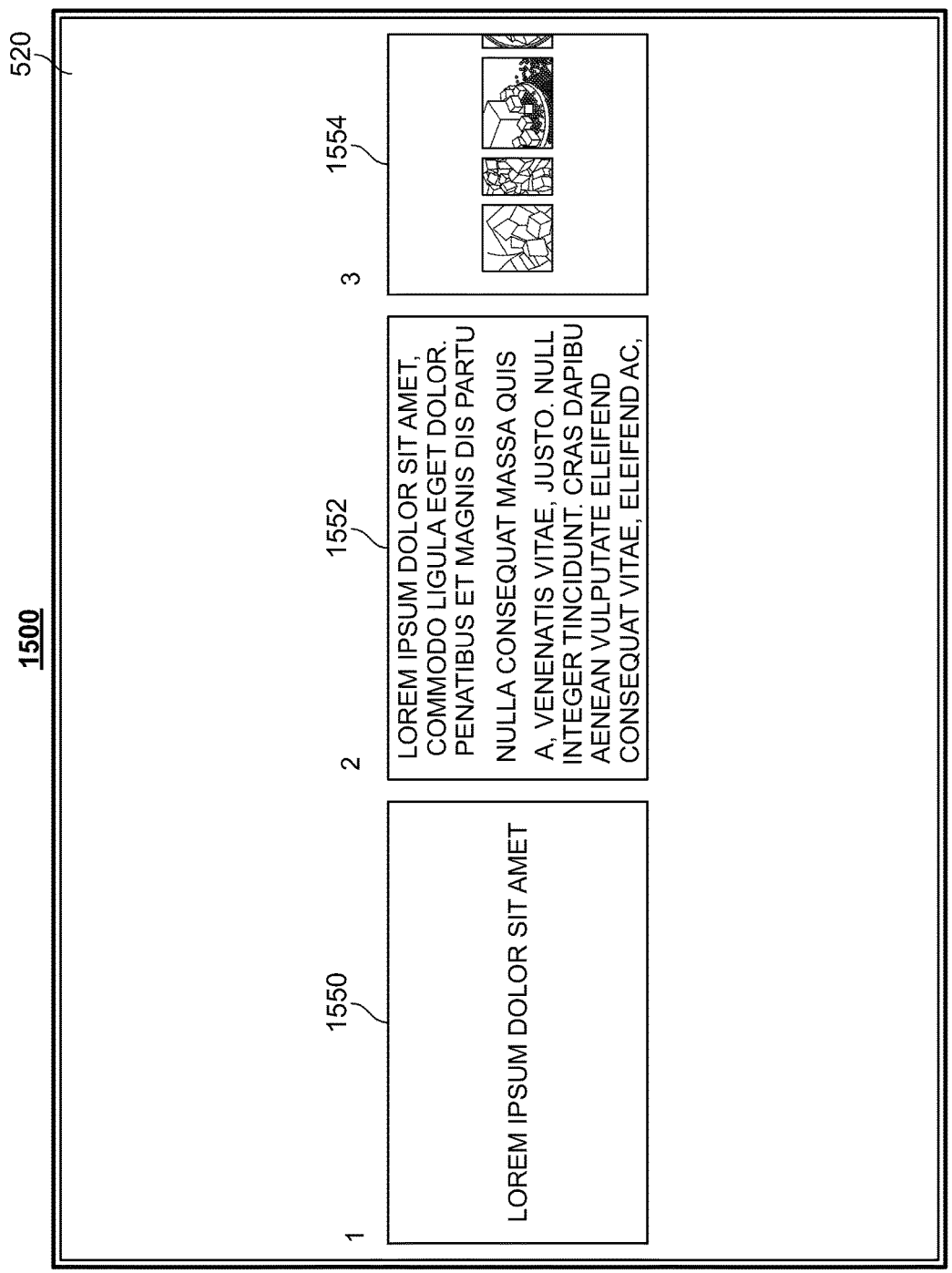
FIG. 15 is a diagram of an example display of document content in a portioned layout, according to an illustrative embodiment.

FIGS. 13-24 depict other examples of how the document layout may be transformed between a continuous layout mode and a portioned layout mode. In particular, FIG. 13 depicts an exemplary display 1300 with document content 520 shown in a continuous layout in a single portion on the left-hand side of the display 1300. FIG. 14 shows another display 1400 of the document content 520 divided into nine portions 1450, 1452, 1454, 1456, 1458, 1460, 1462, 1464 and 1466. These nine portions 1450-1466 include the same document content 520 as was shown in FIG. 13, except FIG. 14 shows the document content during a transition from the continuous layout shown in FIG. 13 to the portioned layout shown in FIG. 15. FIG. 15 shows the same document content in a portioned layout where the portions are formatted side-by-side rather than the overlapping format as shown in FIG. 14. In particular, the portion 1550 includes the same document content as the portion 1450, the portion 1552 includes the same document content as the portion 1452, and the portion 1554 includes the same document content as the portion 1454.

The example displays shown in FIGS. 14-24 are shown at a high level, in which multiple portions may be displayed adjacent to one another, and a user may select one of the portions to view the selected portion alone on the display. After the user is done viewing the selected portion, the user may provide an input indicative of a desire to return to the high level view of the document (such as gesture 1600 in FIG. 16). FIGS. 14-24 show example displays of a user reordering, combining, and removing portions of a document. For example, the user may drag and drop various portions to re-order the portions, such as the example displays shown in FIGS. 17 and 18. To combine portions, the user may drag and drop one portion to the end or beginning of another portion to combine the two portions, such as the example displays shown in FIGS. 19-21. To remove a portion, the user may swipe the portion off of the screen such that the portion is deleted from the document content, such as the example displays shown in FIGS. 22-24. Moreover, the user may select to add one or more portions (not shown).

Figure 16:
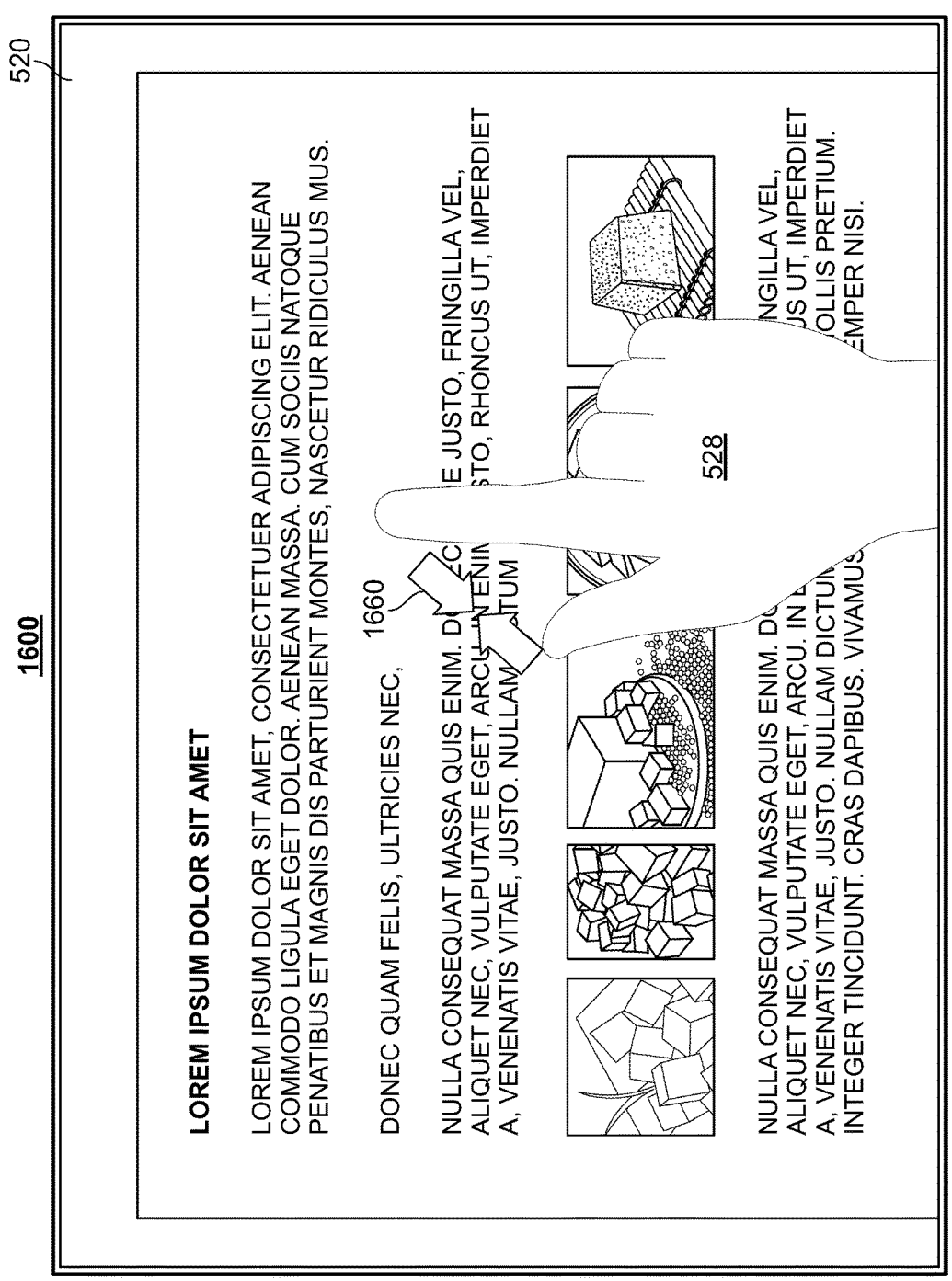
FIG. 16 is a diagram of an example display of a view of one portion of document content in a portioned layout, according to an illustrative embodiment.

FIG. 16 shows a view of the display 1600 when the user selects to view the document content 520 in a continuous layout, such as by selecting the left hand region of the display shown in FIG. 13. In this case, Alternatively, the display 1600 may correspond to a zoom-in view of a portion of the document.

Figure 17:
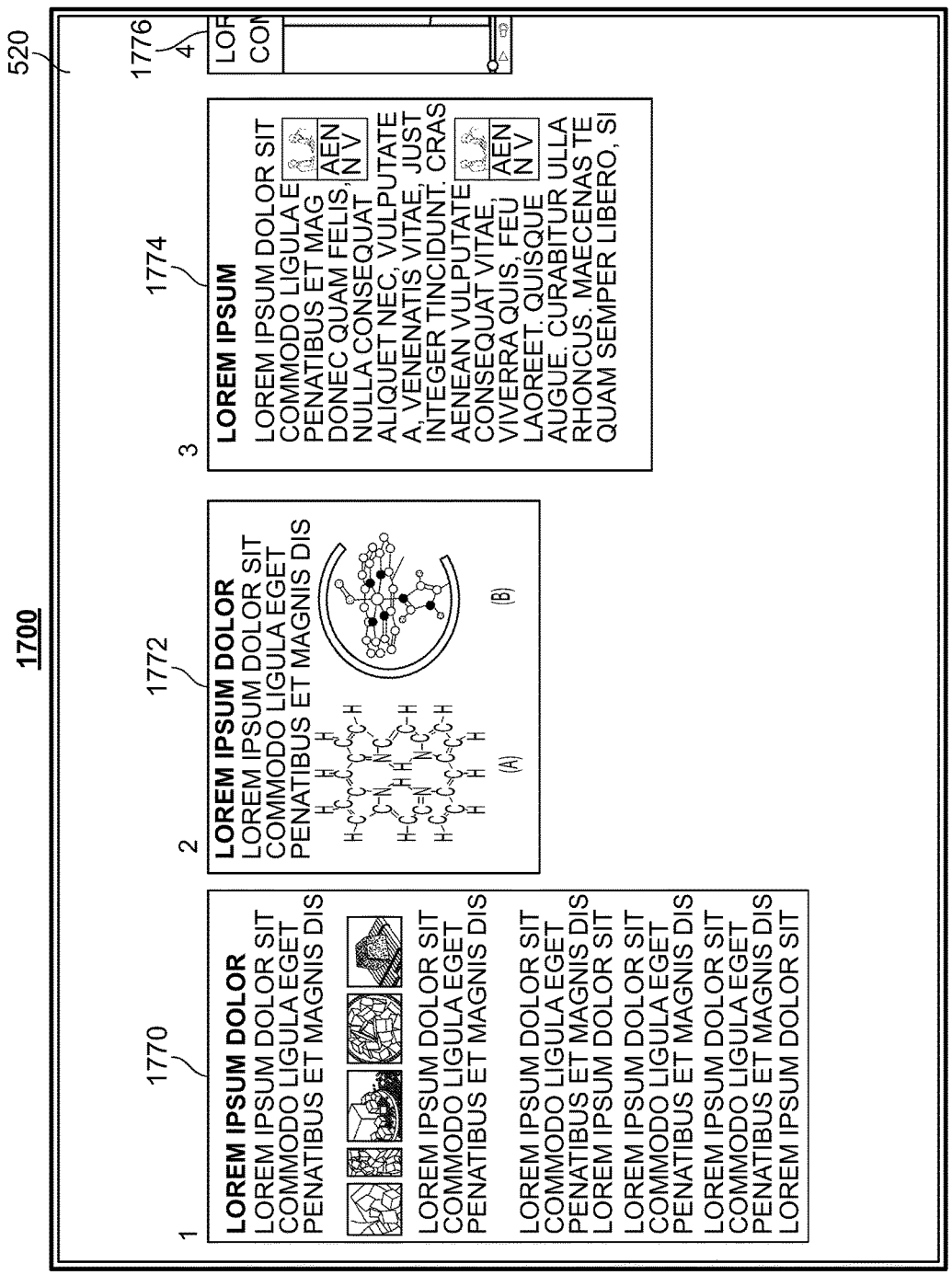
FIG. 17 is a diagram of an example display of document content in a heterogeneous layout, according to an illustrative embodiment.

In some embodiments, the document is displayed in a heterogeneous layout, including both continuous and portioned sections. For example, the displays shown in FIGS. 17-24 include document content that is divided into multiple portions, but each portion has a different length depending on the amount of document content in each portion. In particular, as is shown in FIG. 17, the document content 520 is divided into multiple portions 1770, 1772, 1774 and 1776. Each of the individual portions may be displayed in a continuous layout mode such as that shown in FIG. 16. One way that the user may transition from the continuous layout shown in FIG. 16 to the heterogeneous layout shown in FIG. 17 is by providing a touch gesture, such as that shown in FIG. 16. In particular, the touch gesture 1660 indicates that the pointer 528 slides the index finger and the thumb toward each other. An input such as the touch gesture 1660 is a user input that is indicative of a desire to transition from the zoomed-in view shown in FIG. 16 to the heterogeneous layout view in FIG. 17. In particular, the display 1600 of FIG. 16 may correspond to a zoomed-in view of document content, where the zoomed-in view may be shown in a continuous layout mode (in which case the user may scroll through the entire document) or a portioned mode (in which case the user may only view one portion of the document at a time in the zoomed-in view). In the heterogeneous layout view shown in the display 1700 of FIG. 17, the view of the document content is zoomed-out, such that the display includes a view of multiple portions in the document. In the heterogeneous layout view, when document content is added to each portion, the size of that particular portion may grow. In this case, the size of the font may not be adjusted to fit the document content within a particular portion because the size of the portion may be adjusted.

In the heterogeneous layout, when a first portion is displayed on the screen, the user may provide a touch gesture that indicates a desire to display a second portion of the document content. For example, the user may provide a swipe gesture to display the next portion. The swipe gesture may include a scroll to the end of the first portion, followed by an over-scroll touch gesture to display the next portion.

FIG. 17 shows a display 1700 of a heterogeneous layout of the document content 520. The display 1700 may be shown in response to receiving the touch gesture 1660 of FIG. 16. In particular, the heterogeneous layout shown in FIG. 17 includes various portions of the document content 520 having different sizes. The portions 1770, 1772, 1774 and 1776 are shown side-by-side and have the same width but different heights.

Figure 18:
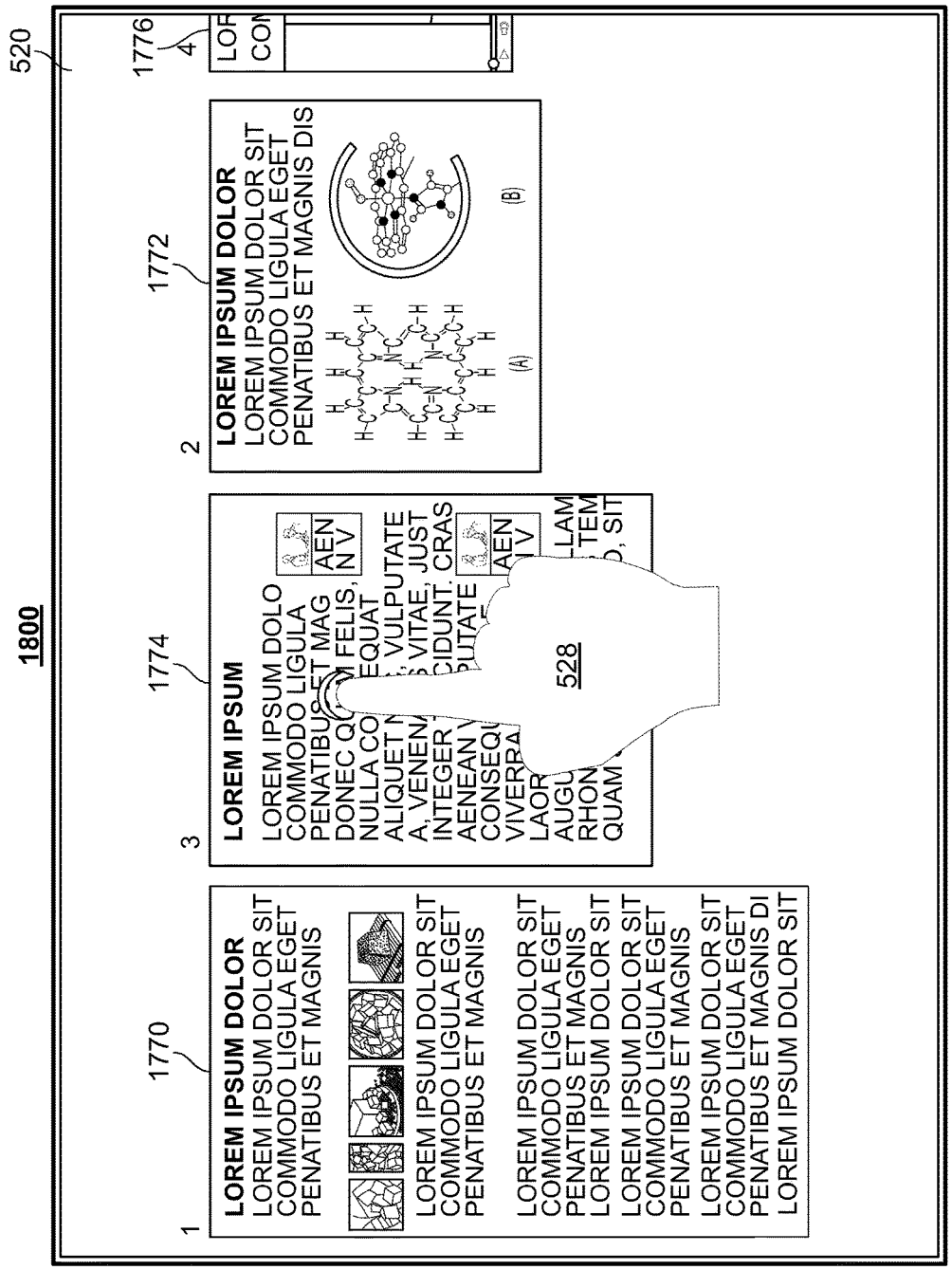
FIG. 18 is a diagram of an example display of document content in a heterogeneous layout, where a user modifies an order of portions of the document content, according to an illustrative embodiment.

The user may provide user input indicative of a desire to modify any of the portions 1770-1776. In an example, FIG. 18 shows the resulting display 1800 when a user uses the pointer 528 to indicate a desire to modify the ordering of the portions. In particular, FIG. 18 shows the result when the user input indicates a desire to swap the positions of the portions 1772 and 1774 compared to their original positions in FIG. 17. As is shown in FIG. 18, the user may provide such a user input by controlling the pointer 528 to select and drag the portion 1774 to precede the portion 1772. Alternatively, the user may control the pointer 528 to select and drag the portion 1772 to follow the portion 1774. FIG. 18 shows the result when the positions of two portions are swapped. However, the user may select to update the ordering of the portions by selecting and dragging a portion across any number of other portions, such that the positions of more than two portions may be affected by such a modification.

Figure 19:
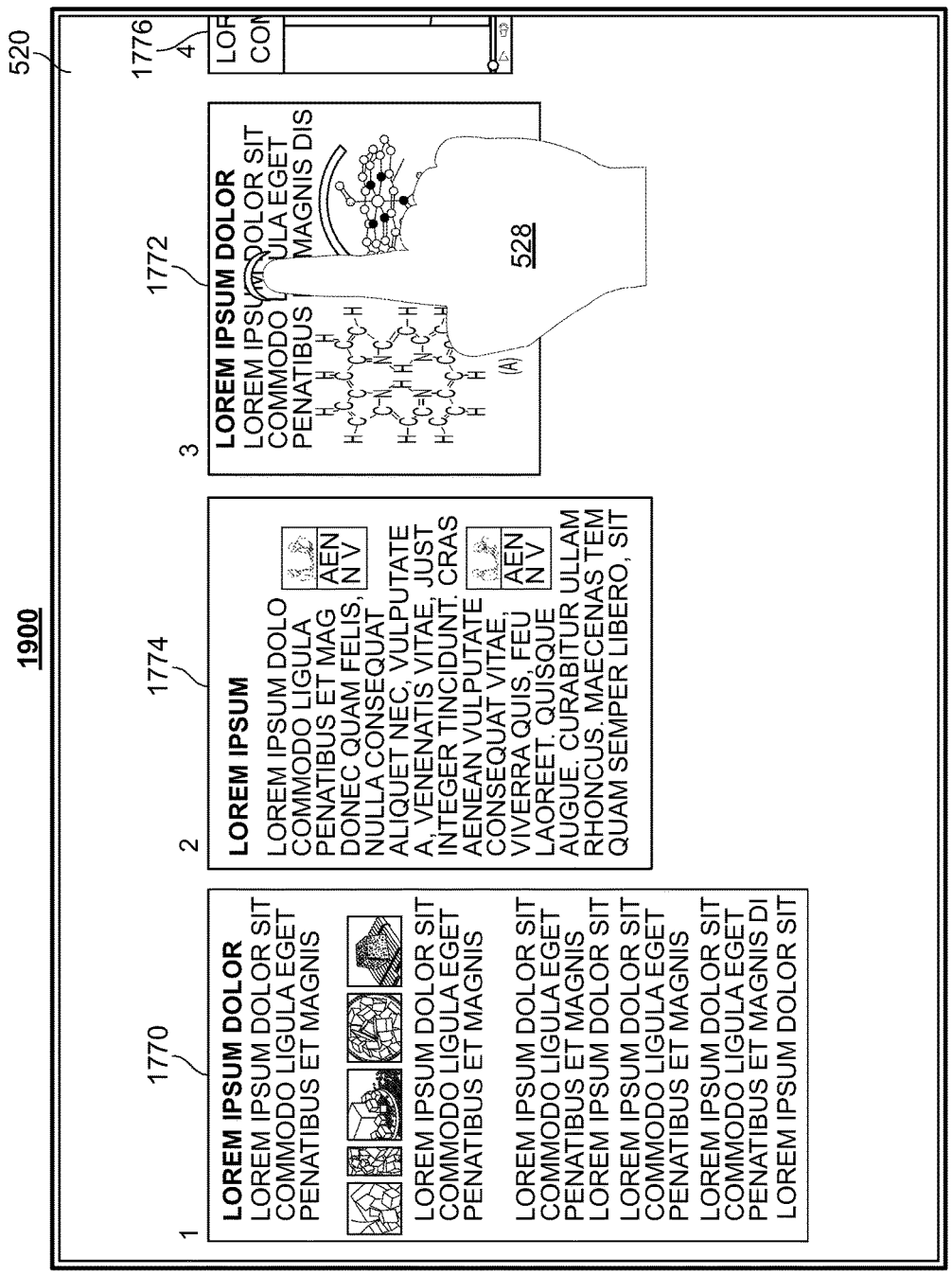
FIGS. 19-21 are diagrams of example displays of document content in a heterogeneous layout, where a user combines two portions of the document content, according to an illustrative embodiment.
Figure 20:
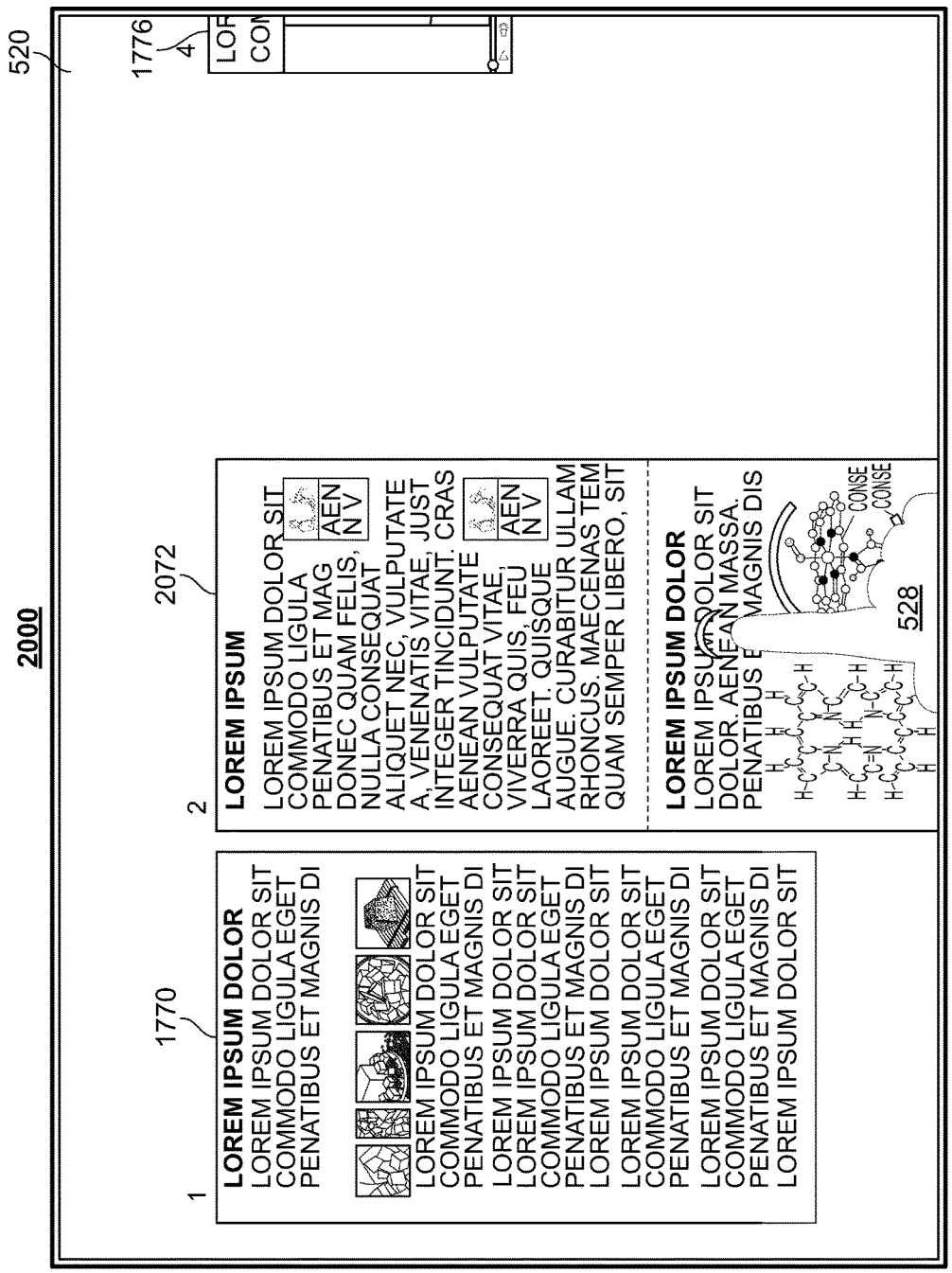

FIGS. 19 and 20 depict a way for the user to modify a set of boundaries by removing a boundary in the set. To remove a boundary, the user may select to combine any two portions of the document content 520 by selecting one portion and dragging the select portion directly below or above another portion. In particular, as is shown in FIG. 19, the user controls the pointer 528 to select the portion 1772, and in FIG. 20, the user controls the pointer 528 to drag the portion 1772 to be positioned directly below the portion 1774. Releasing the pointer 528 at this position causes the two portions 1774 and 1772 to be combined into a single combined portion 2072 as is shown in FIG. 20. The combined portion 2072 includes the document content from 1774 above the document content from the portion 1772. In this manner, the user has effectively removed the boundary between the portions 1774 and 1772.

Figure 21:
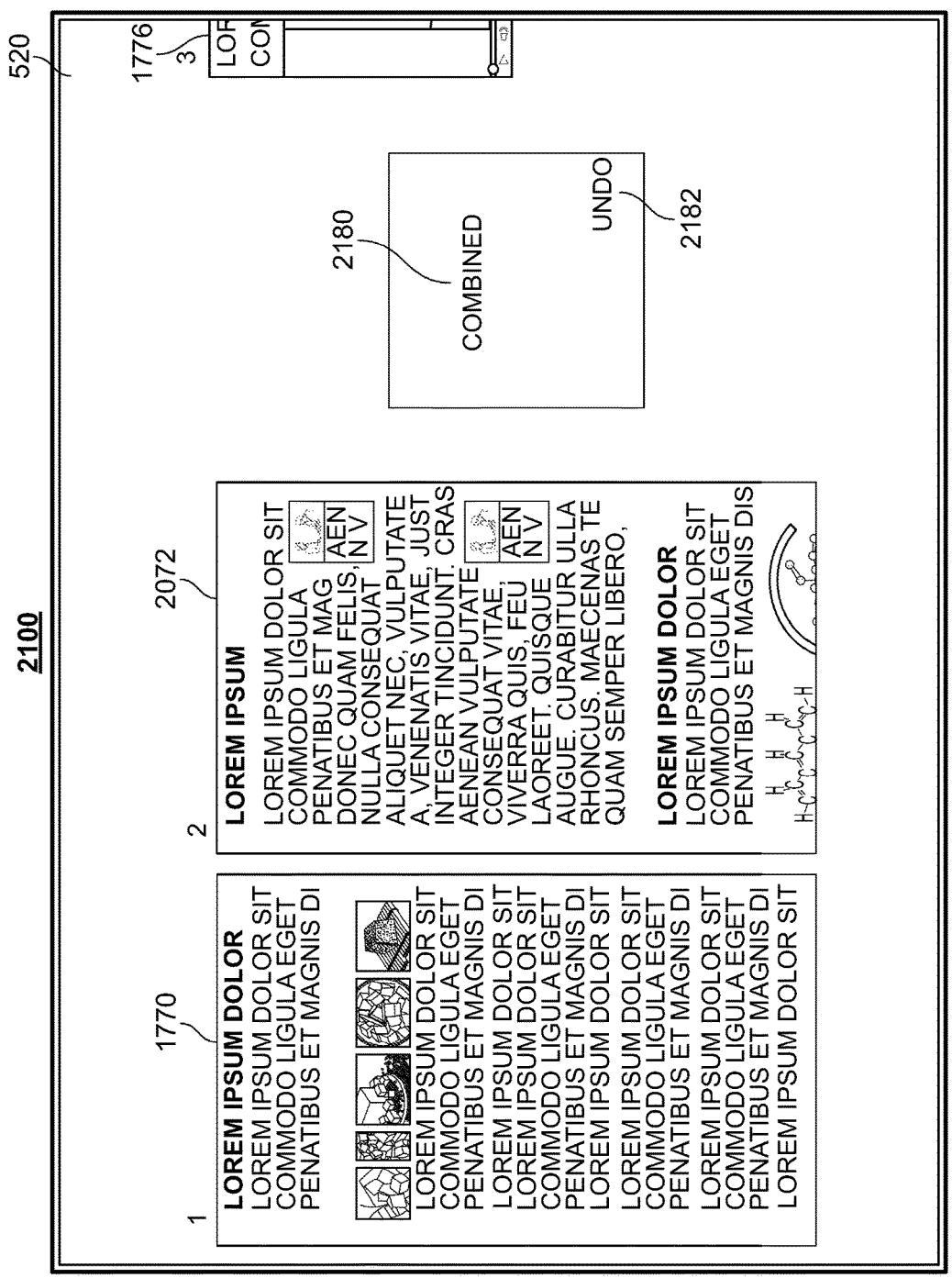

FIG. 21 shows the resulting screen after the portions 1774 and 1772 are combined into the combined portion 2072. In the display 2100, a region 2180 indicates that the user has combined two portions together into a combined portion.

Figure 22:
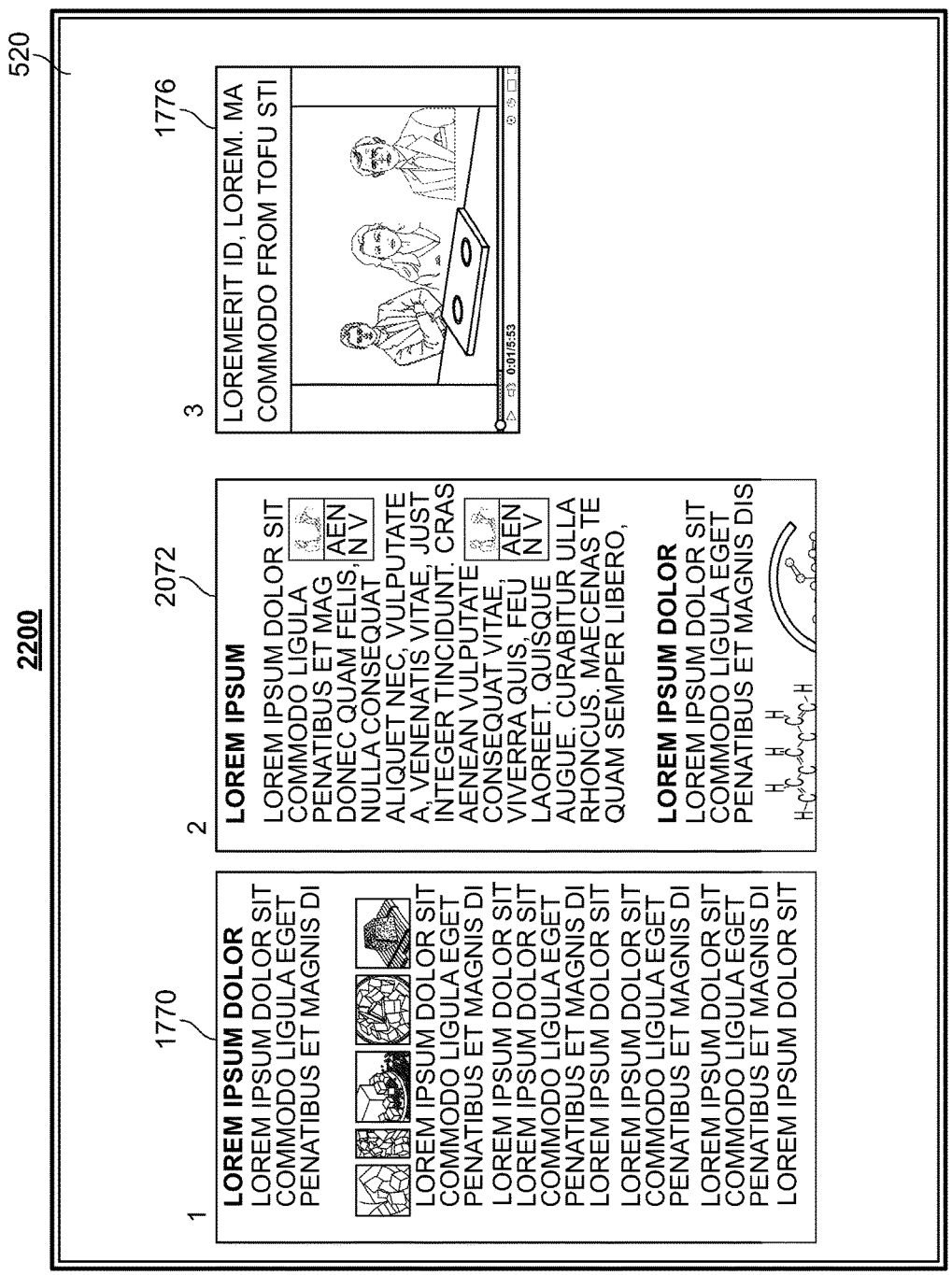
FIGS. 22-24 are diagrams of example displays of document content in a heterogeneous layout, where a user deletes a portion of the document content, according to an illustrative embodiment.

The user is provided an undo option 2182 to undo the combining. In some embodiments, the region 2180 may include a confirm button, such upon selecting the confirm button, the region 2180 is removed. The resulting display may be as is shown in FIG. 22, in which the portion 1776 is moved from an original position to the right of the region 2180 to a new position to the immediate right of the combined portion 2072.

Figure 23:
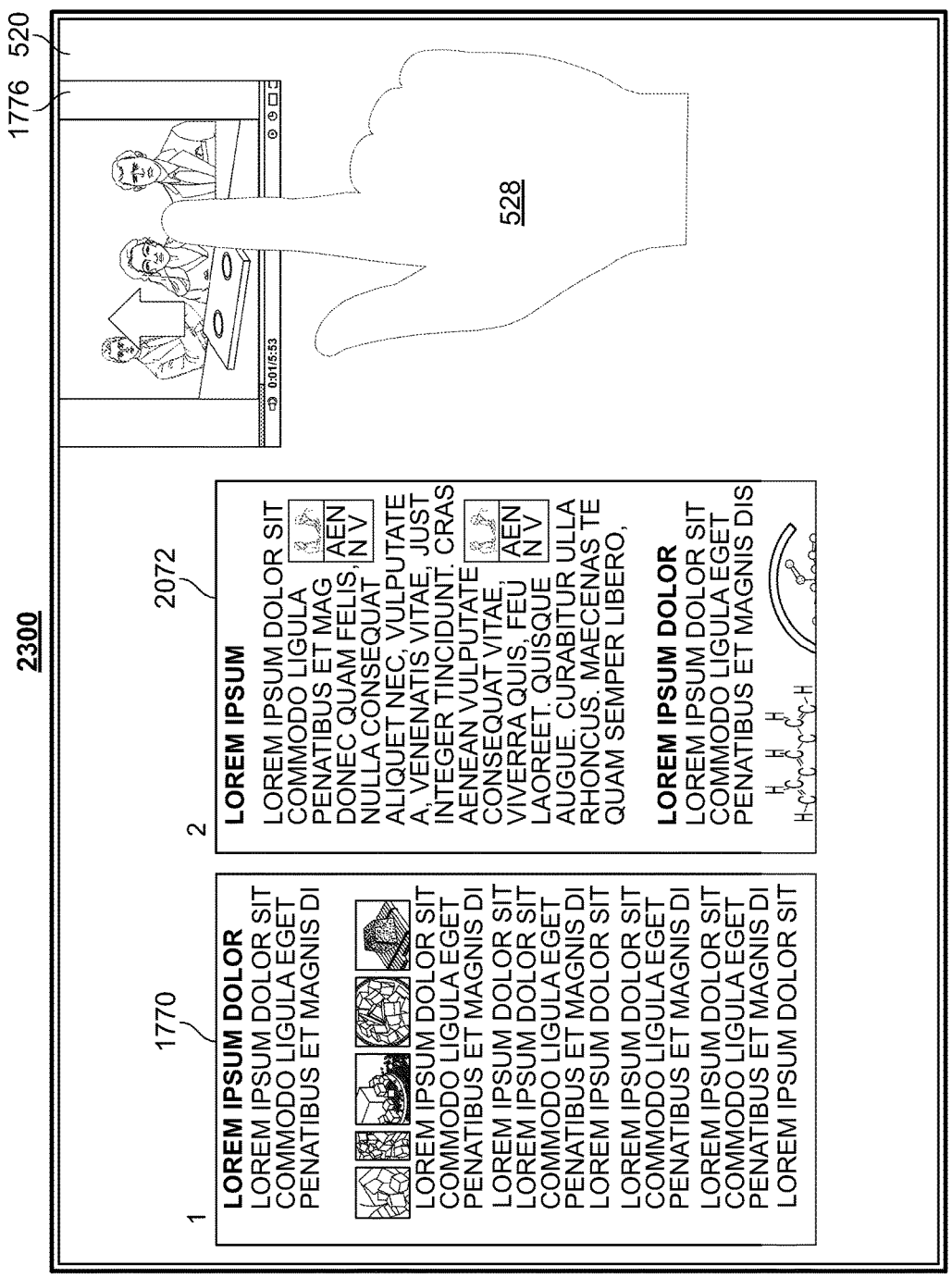
Figure 24:
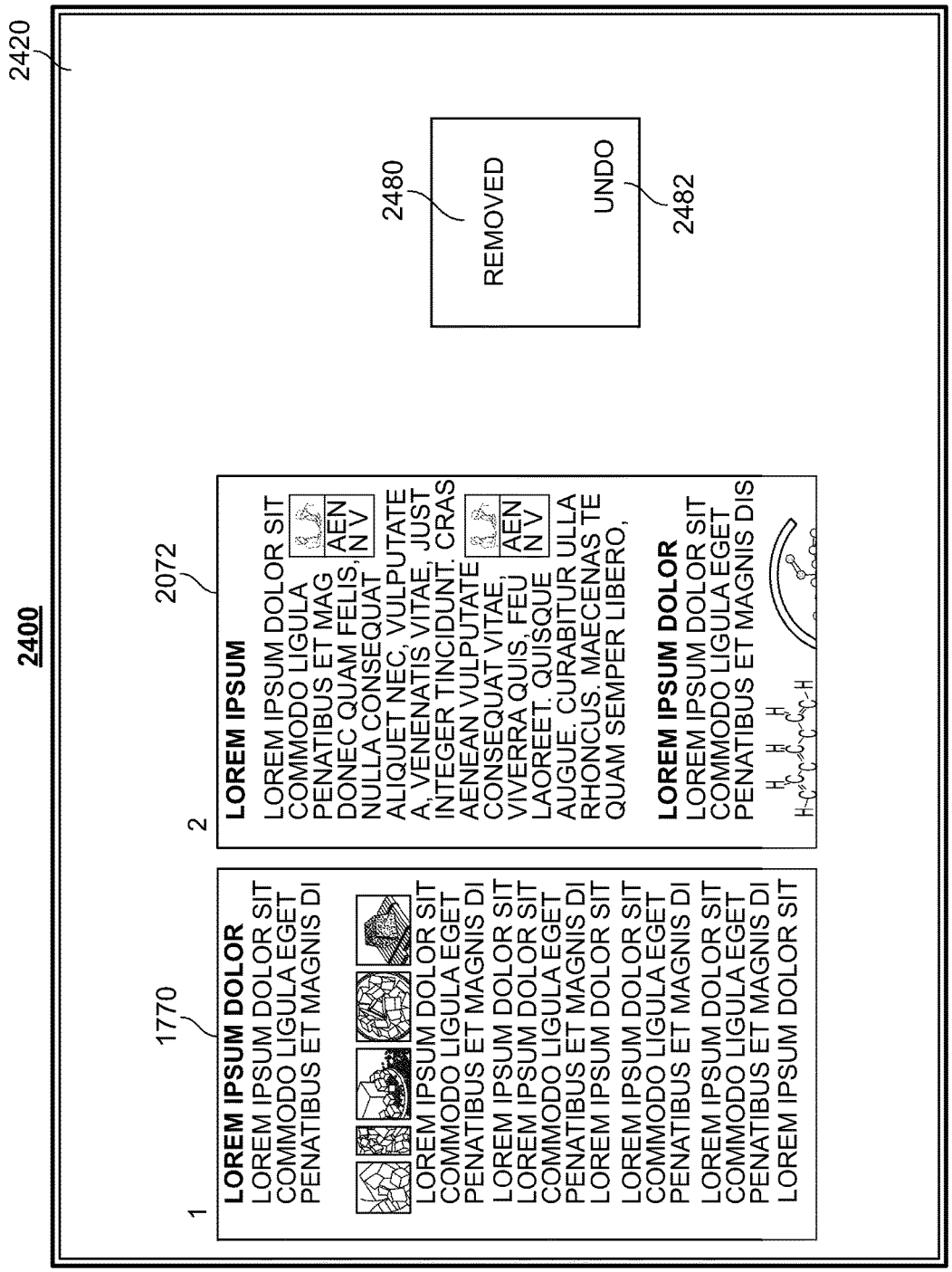

In some embodiments, the user may modify the document content 520 by removing one or more portions of the document content 520 to result in updated document content 2420. An example is shown in FIG. 23 in which the user provides a touch gesture, such as an upward swiping motion, that may delete the portion 1776 from the document content 520. FIG. 24 includes a region 2480, which is provided after the removal of the portion 1776 to notify the user that a portion has been removed. As was described in relation to FIG. 21, the region 2480 includes an undo option 2482 to undo the removal. In this case, selecting the undo button 2482 would cause the portion 1776 to be returned to the updated document content 2420.

FIG. 4 is a flowchart of a method 400 for transforming document content from a first layout to a second layout. The method 400 may be executed by a processor, such as the processor 104 or the layout renderer 108 or a combination of both, and includes the steps of displaying the document in a first layout (step 402), receiving a first user input indicative of a request to convert the display from the first layout to a second layout that represents the document as having a plurality of portions (step 404), identifying a suggested boundary at a first position between two of the plurality of portions (step 406), displaying a document in a second layout having the suggested boundary at the first position (step 408), receiving a second user input indicative of a request to move the suggested boundary to a second position different from the first position (step 410), and displaying the document in a second layout having the boundary in the second position (step 412).

At step 402, the document is displayed in a first layout. In an example, the first layout may correspond to the continuous layout as shown in FIGS. 5 and 13, and may represent the document as a single continuous scrolling portion. Depending on the length of the document content, the display of the document in the first layout may include a scrollbar for the user to view various regions of the document.

At step 404, the processor 104 receives a first user input indicative of a request to convert the display from the first layout to a second layout. When the first layout corresponds to the continuous layout, the second layout may correspond to the portioned layout that represents the document as having a plurality of portions. Examples of the second layout are shown and described in relation to FIGS. 6-12 and 14-24. As is shown in FIG. 5, the first user input may correspond to a selection of a portioned mode region 526 that indicates a desire to convert the document content 520 to the portioned layout. In another example, the user may provide a touch gesture such as 1660 (shown in FIG. 16) to indicate a desire to display the document content 520 in a plurality of portions, as is shown in FIG. 17. These examples of user input are described herein for illustrative example only. In general, one of ordinary skill in the art will understand that the first user input may include a selection of a button, a detection of a particular touch gesture, or any other suitable user input indicative of a desire to convert the layout of a display of a document from one layout into another layout. In an example, converting the document content from one layout to another layout is effectively an edit action that applies changes to the contents of the document.

At step 406, a suggested boundary is identified at a first position between two of a plurality of portions. As is described in relation to FIG. 6, a suggested boundary may be identified by the processor 104 or the layout renderer 108 by examining the document content 520 for appropriate portions. In one example, the processor 104 may recognize that a first line of the document content 520 corresponds to a title of the document. In this case, a position of the suggested boundary may be identified to occur immediately following the title, such that the title is displayed by itself on a single portion. In one example, the processor 104 may recognize that images such as those shown in the portion 933 of FIG. 9 should be placed on a slide without any other content. In this case, suggested boundaries may be positioned directly above and below those images, as is shown in FIG. 12. As is described in relation to FIG. 6, the positions of other suggested boundaries may be identified based any other suitable features of the document content, such as the length of the document content and the size(s) and dimension(s) of the portions, such as is shown in the region 630 of FIG. 6.

The number of suggested boundaries may be initially determined by the processor 104 (based on the amount of document content and the size(s) and dimensions of the portions, for example). Alternatively, the user may provide a number of portions or boundaries that should be used to divide the document content 520. In this case, the initial set of suggested boundaries that are determined by the processor 104 has a predetermined number of boundaries to apply to the document content 520.

At step 408, the document is displayed in the second layout having the suggested boundary at the first position. As an example, FIG. 6 shows an initial display of the document content 520 with the suggested boundaries 632 and 634.

At step 410, the processor 104 receives a second user input indicative of a request to move the suggested boundary to a second position that is different from the first position. As is shown and described in relation to FIGS. 7-9, a user input may include selecting and dragging the suggested boundary 634, downward to a new position of the boundary 934 shown in FIG. 9. In this case, the second position of the boundary 934 is different from the first position of the suggested boundary 634, and the user has moved the suggested boundary to a different position than was originally suggested.

In some embodiments, additional user input is received to add one or more boundaries to the current set of boundaries. The current set of boundaries may correspond to the set of suggested boundaries initially determined by the processor 104, or a modified version of the set of suggested boundaries. As is described in relation to FIG. 10, the user may select the add button 636, which results in the addition of a new boundary 1038. As shown in FIGS. 11 and 12, the user may select and drag the new boundary 1038 to a new position. Upon detecting the user's release of the new boundary, the new boundary is converted to an existing boundary 1238 in FIG. 12.

In some embodiments, additional user input is received to remove one or more boundaries from the current set of boundaries. As is described in to FIGS. 19 and 20, the user may provide a user input that selects a portion 1772 and combines that selected portion 1772 with another portion 1774 to result in a combined portion 2072. In this manner, the previous boundary between the two portions 1774 and 1772 is removed. Likewise, any of the boundaries shown in FIGS. 6-12 may be removed, and portions may be combined, upon detection of a user input indicative of a removal of a boundary, such as a user swipe gesture.

Moreover, as is described in relation to FIGS. 23 and 24, the user may provide an additional user input that indicates a removal of a portion 1776 of the document content 520. Removing a portion of the document content causes the document content 520 to become updated document content 2420, and the boundary between portions 2072 and 1776 is removed.

At step 412, the document is displayed in a second layout, having the boundary in the second position. An example of this display is shown in FIG. 10, in which the new position of the boundary 1034 is used, rather than the previous position of the suggested boundary 634 in FIG. 6. In some embodiments, switching from one mode to another mode modifies the document content itself. In this case, when a document in the continuous layout mode is switched to the portioned layout mode, the boundaries and templates associated with the various portions of the document are stored with the document content as part of the file. To return to the previous mode, the user may provide an "undo" input to undo the change to the document. In other embodiments, switching from one mode to another mode only affects the view of the document content, but not the document content itself. In this case, the layout renderer 108 only changes the way in which the document content is displayed across the different modes, but the document content itself is not modified.

In some embodiments, when the document content is displayed in the portioned layout, the user may provide another user input indicative of a desire to convert the display of the document content to the continuous layout, such as selection of the continuous mode region 524 of FIG. 5. In some embodiments, when the display returns to the continuous layout from the portioned layout, the parameters of the last displayed portioned layout may be stored into the memory 106. Examples of the parameters may include the positions of the boundaries and the sizes and layout of the document content on the various portions. In this case, if the user wishes to return to the portioned layout from the continuous layout, the stored parameters may be used by the layout renderer 108 to generate the portioned layout of the document. If the document content is not modified, the user may quickly switch between the continuous and portioned layouts because the parameters of the portioned layout are already defined and easily remembered by the layout renderer 108.

If the document content is modified while in the continuous layout mode, the stored parameters may be adjusted accordingly. In an example, if at least a threshold amount of content is added, one or more boundaries may be added. In an example, if at least a threshold amount of content is removed, one or more boundaries may be removed. In an example, the size of the text or objects (such as images, tables, graphs, charts, or any other suitable object in a document) may be adjusted to fit on one or more particular portions in which an amount of content that is less than threshold is added or removed. In particular, the size of text or objects on a particular portion may be increased if a small amount of content is removed, and the size of text or objects on another portion may be decreased if a small amount of content is added. In some embodiments, the stored parameters for the portioned layout may be adjusted in real time, as the document content is being modified in the continuous layout mode. Alternatively, the stored parameters may be adjusted upon return to the portioned layout mode. In some embodiments, the layout renderer 108 may allow for easy conversion between the continuous layout mode and the portioned layout mode by displaying a temporary preview of the document content organized into a layout.

In some embodiments, it may be computationally expensive to store the last set of parameters for the portioned layout, such that when the user converts from a portioned layout mode to a continuous layout mode, the parameters for the portioned layout are discarded. In this case, if the user wishes to return to the portioned layout mode, the processor 104 may provide a set of suggested boundaries that is not based on the last view of the portioned layout mode.

The systems and methods of the present disclosure enables users to select and manipulate document content on user device such as a computer, a tablet, or a mobile device. In particular, using the present disclosure, users may easily manipulate various portions of a document by moving boundaries and/or portions around on a screen. Without the systems and methods herein, a user would have to use a mouse cursor and/or keyboard input on a computer to manipulate document content. For example, the user would select a portion of a document, cut or copy the portion, navigate to a new region of the document, and paste the cut or copied portion. Using a touch screen with the present disclosure is advantageous at least because touch gestures provide an easier and more intuitive way to divide document content into portions and move document content to a desired section of a document.

Figure 25:
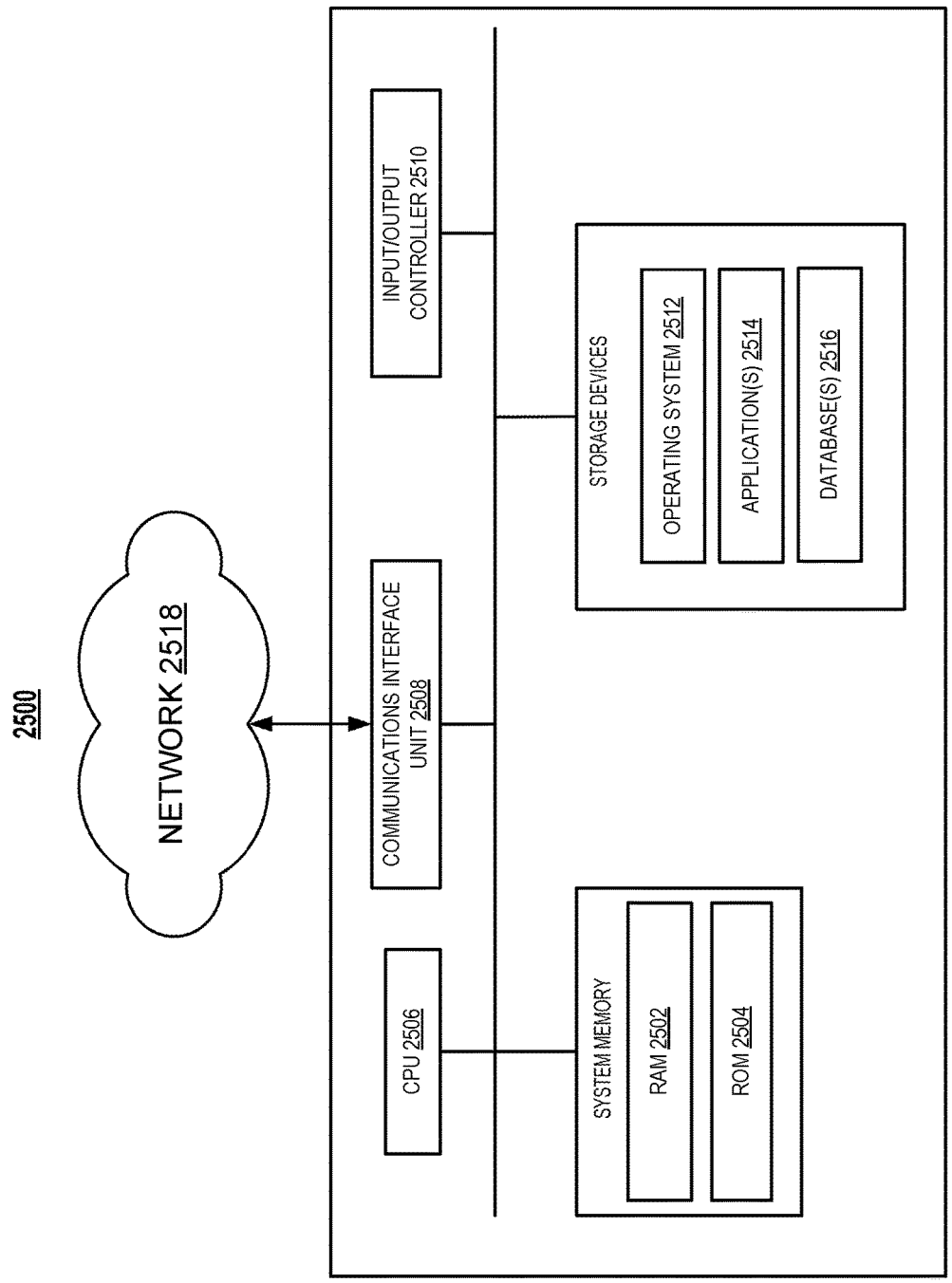
FIG. 25 is a block diagram of a computing device, such as any of the components of the system of FIG. 1, for performing any of the processes described herein.

FIG. 25 is a block diagram of a computing device, such as any of the components of the system of FIG. 1, for performing any of the processes described herein. Each of the components of these systems may be implemented on one or more computing devices 2500. In certain aspects, a plurality of the components of these systems may be included within one computing device 2500. In certain implementations, a component and a storage device may be implemented across several computing devices 2500.

The computing device 2500 comprises at least one communications interface unit, an input/output controller 2510, system memory, and one or more data storage devices. The system memory includes at least one random access memory (RAM 2502) and at least one read-only memory (ROM 2504). All of these elements are in communication with a central processing unit (CPU 2506) to facilitate the operation of the computing device 2500. The computing device 2500 may be configured in many different ways. For example, the computing device 2500 may be a conventional standalone computer or alternatively, the functions of computing device 2500 may be distributed across multiple computer systems and architectures. In FIG. 25, the computing device 2500 is linked, via network or local network, to other servers or systems.

The computing device 2500 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 2508 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 2506 comprises a processor, such as one or more conventional microprocessors and one or more supplementary co-processors such as math co-processors for offloading workload from the CPU 2506. The CPU 2506 is in communication with the communications interface unit 2508 and the input/output controller 2510, through which the CPU 2506 communicates with other devices such as other servers, user terminals, or devices. The communications interface unit 2508 and the input/output controller 2510 may include multiple communication channels for simultaneous communication with, for example, other processors, servers or client terminals.

The CPU 2506 is also in communication with the data storage device. The data storage device may comprise an appropriate combination of magnetic, optical or semiconductor memory, and may include, for example, RAM 2502, ROM 2504, flash drive, an optical disc such as a compact disc or a hard disk or drive. The CPU 2506 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 2506 may be connected to the data storage device via the communications interface unit 2508. The CPU 2506 may be configured to perform one or more particular processing functions.

The data storage device may store, for example, (i) an operating system 2512 for the computing device 2500; (ii) one or more applications 2514 (e.g., computer program code or a computer program product) adapted to direct the CPU 2506 in accordance with the systems and methods described here, and particularly in accordance with the processes described in detail with regard to the CPU 2506; or (iii) database(s) 2516 adapted to store information that may be utilized to store information required by the program.

The operating system 2512 and applications 2514 may be stored, for example, in a compressed, an uncompiled and an encrypted format, and may include computer program code. The instructions of the program may be read into a main memory of the processor from a computer-readable medium other than the data storage device, such as from the ROM 2504 or from the RAM 2502. While execution of sequences of instructions in the program causes the CPU 2506 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions described herein. The program also may include program elements such as an operating system 2512, a database management system and "device drivers" that allow the processor to interface with computer peripheral devices (e.g., a video display, a keyboard, a computer mouse, etc.) via the input/output controller 2510.

The term "computer-readable medium" as used herein refers to any non-transitory medium that provides or participates in providing instructions to the processor of the computing device 2500 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 2506 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 2500 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method for transitioning a display of a document from a first layout to a second layout, the method comprising:

displaying, by a processor, the document in the first layout at a user interface, wherein the first layout displays the document in a continuous view that does not provide page boundaries that define pages having predetermined dimensions with respect to height and width;

receiving, by the processor, a first user request to convert the display of the document from the first layout to the second layout that displays the document in a plurality of layout portions that correspond to the pages of the document;

responsive to the first user request, determining, by the processor, a suggested page boundary within the first layout of the document by identifying an end of first content of a first content type and a beginning of second content of a second content type in the document, wherein the first content type and the second content type are different content types, wherein the suggested page boundary comprises a virtual line placed at a first position between the end of first content of the first content type and the beginning of second content of the second content type, the virtual line separating at least two layout portions of the plurality of layout portions into separate pages that have the predetermined dimensions with respect to the height and the width;

scaling the second content of the second content type to fit within the predetermined dimensions with respect to the height and the width of a respective page associated with the second layout;

displaying, by the processor, the document in the second layout having the suggested page boundary at the first position and the scaled second content;

subsequent to displaying the document in the second layout having the suggested page boundary at the first position, receiving, by the processor, a second user request to move the suggested page boundary to a second position different from the first position; and displaying, by the processor, the document in the second layout having the page boundary in the second position.

2. The method of claim 1, wherein the first content type and the second content type comprise at least a different one of text content, paragraph content, header content, image content, table content, or formatting content.

3. The method of claim 2, wherein the suggested page boundary at the first position immediately precedes the paragraph content, the header content, the image content, or the table content and immediately follows a different one of the paragraph content, the image content, or the table content.

4. The method of claim 1, wherein the second position of the page boundary is a parameter of the second layout and is stored with the document.

5. The method of claim 1, wherein the first layout displays the document as a single continuous scrolling portion.

6. The method of claim 1, further comprising:
receiving, by the processor, a third user request to convert the display from the second layout to the first layout; and
combining the plurality of layout portions in the second layout into the continuous view that is absent the page boundaries that define the pages of the document.

7. The method of claim 1, wherein first content and second content of the document in the first layout is displayed at a first size, wherein the first content and the second content of the document in the second layout is displayed at a second size different from the first size, and wherein the first content and second content is at least a different one of text content, image content, or table content.

8. The method of claim 1, wherein the user interface includes a touch screen and the first user request is initiated by a first touch input and the second user request is initiated by a second touch input with respect to the touch screen.

9. The method of claim 1, further comprising receiving, by the processor, a fourth user request to add an additional page boundary at a third position in the document displayed in the second layout.

10. The method of claim 1, further comprising receiving, by the processor, a fifth user request to reorder the plurality of layout portions in the second layout or to combine at least two of the plurality of layout portions into a single portion.

11. The method of claim 1, wherein to convert the display of the document from the first layout to the second layout, the processor to identify a subject matter in the document or to identify various objects of the document.

12. The method of claim 1, wherein the suggested page boundary is determined based on a size of a display of a user device.

13. A system for transitioning a display of a document from a first layout to a second layout, the system comprising:
a memory; and
a processor, coupled to the memory, to:
display the document in the first layout at a user interface, wherein the first layout displays the document in a continuous view that does not provide page boundaries that define pages having predetermined dimensions with respect to height and width;
receive a first user request to convert the display of the document from the first layout to the second layout that displays the document in a plurality of layout portions that correspond to the pages of the document;
responsive to the first user request, determine a suggested page boundary within the first layout of the document by identifying an end of first content of a first content type and a beginning of second content of a second content type in the document, wherein the first content type and the second content type are different content types, wherein the suggested page boundary comprises a virtual line placed at a first position between the end of first content of the first content type and the beginning of second content of the second content type, the virtual line separating at least two layout portions of the plurality of layout portions into separate pages that have the predetermined dimensions with respect to the height and the width;
scale the second content of the second content type to fit within the predetermined dimensions with respect to the height and the width of a respective page associated with the second layout;
display the document in the second layout having the suggested page boundary at the first position and the scaled second content;
subsequent to displaying the document in the second layout having the suggested page boundary at the first position, receive a second user request to move the suggested page boundary to a second position different from the first position; and
display the document in the second layout having the page boundary in the second position.

14. The system of claim 13, wherein the first content type and the second content type comprise at least a different one of text content, paragraph content, header content, image content, table content, or formatting content.

15. The system of claim 14, wherein the suggested page boundary at the first position immediately precedes the paragraph content, the header content, the image content, or the table content and immediately follows a different one of the paragraph content, the image content, or the table content.

16. The system of claim 13, wherein the second position of the page boundary is a parameter of the second layout and is stored with the document.

17. The system of claim 13, wherein the first layout displays the document as a single continuous scrolling portion.

18. The system of claim 13, wherein the processor is further to:
receive a third user request to convert the display from the second layout to the first layout; and
combine the plurality of layout portions in the second layout into a single continuous portion.

19. The system of claim 13, wherein the first content and second content of the document in the first layout is displayed at a first size, wherein the first content and the second content of the document in the second layout is displayed at a second size different from the first size, and wherein the first content and the second content is at least a different one of one of text content, image content, or table content.

20. The system of claim 13, wherein the user interface includes a touch screen and the first user request is initiated by a first touch input and the second user request is initiated by a second touch input with respect to the touch screen.

21. The system of claim 13, wherein the processor is further to receive a fourth user request to add an additional page boundary at a third position in the document displayed in the second layout.

22. The system of claim 13, wherein the processor is further to receive a fifth user request to reorder the plurality of layout portions in the second layout or to combine at least two of the plurality of layout portions into a single portion.

23. A non-transitory computer-readable medium comprising instruction for transitioning a display of a document from a first layout to a second layout that, responsive to execution by a processor, cause the processor to perform operations comprising:

displaying, by the processor, the document in the first layout at a user interface, wherein the first layout displays the document in a continuous view that is absent page boundaries that define pages having predetermined dimensions with respect to height and width;

receiving, by the processor, a first user request to convert the display of the document from the first layout to the second layout that displays the document in a plurality of layout portions that correspond to the pages of the document;

responsive to the first user request, determining, by the processor, a suggested page boundary within the first layout of the document by identifying an end of first content of a first content type and a beginning of second content of a second content type in the document, wherein the first content type and the second content type are different content types, wherein the suggested page boundary comprises a virtual line placed at a first position between the end of first content of the first content type and the beginning of second content of the second content type, the virtual line separating at least two layout portions of the plurality of layout portions into separate pages that have the predetermined dimensions with respect to the height and the width;

scaling the second content of the second content type to fit within the predetermined dimensions with respect to the height and the width of a respective page associated with the second layout;

displaying, by the processor, the document in the second layout having the suggested page boundary at the first position and the scaled second content;

subsequent to displaying the document in the second layout having the suggested page boundary at the first position, receiving, by the processor, a second user request to move the suggested page boundary to a second position different from the first position; and displaying, by the processor, the document in the second layout having the page boundary in the second position.

24. The non-transitory computer-readable medium of claim 23, the operations further comprising:

receiving, by the processor, a third user request to convert the display from the second layout to the first layout; and combining the plurality of layout portions in the second layout into the continuous view that is absent the page boundaries that define the pages of the document.

* * * * *